United States Patent
Lilja et al.

(10) Patent No.: US 10,520,975 B2
(45) Date of Patent: Dec. 31, 2019

(54) POLYSYNCHRONOUS STOCHASTIC CIRCUITS

(71) Applicant: Regents of the University of Minnesota, Minneapolis, MN (US)

(72) Inventors: David J. Lilja, Maplewood, MN (US); Mohammadhassan Najafi, Minneapolis, MN (US); Marcus Riedel, Minneapolis, MN (US); Kiarash Bazargan, Plymouth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 225 days.

(21) Appl. No.: 15/448,997

(22) Filed: Mar. 3, 2017

(65) Prior Publication Data

US 2017/0255225 A1 Sep. 7, 2017

Related U.S. Application Data

(60) Provisional application No. 62/303,100, filed on Mar. 3, 2016.

(51) Int. Cl.
*G06F 1/12* (2006.01)
*G06F 7/70* (2006.01)
*G06T 1/00* (2006.01)

(52) U.S. Cl.
CPC .............. *G06F 1/12* (2013.01); *G06F 7/70* (2013.01); *G06T 1/00* (2013.01)

(58) Field of Classification Search
CPC .. G06F 7/70; G06F 1/12; G06F 19/00; G06N 3/0472; G06T 1/00
See application file for complete search history.

(56) References Cited

U.S. PATENT DOCUMENTS

| | | | | |
|---|---|---|---|---|
| 5,412,587 A | * | 5/1995 | Holt | G06F 7/70 708/250 |
| 6,745,219 B1 | | 6/2004 | Zelkin | |
| 7,095,439 B2 | * | 8/2006 | Hammadou | H04N 5/357 257/291 |
| 7,424,500 B2 | | 9/2008 | Fukushima et al. | |

(Continued)

FOREIGN PATENT DOCUMENTS

CN 104615406 5/2013

OTHER PUBLICATIONS

Tsitsiklis, John, Dimitri Bertsekas, and Michael Athans. "Distributed asynchronous deterministic and stochastic gradient optimization algorithms." IEEE transactions on automatic control 31.9 (1986): 803-812. (Year: 1986).*

(Continued)

*Primary Examiner* — Jaweed A Abbaszadeh
*Assistant Examiner* — Brian J Corcoran
(74) *Attorney, Agent, or Firm* — Shumaker & Sieffert, P.A.

(57) ABSTRACT

In some examples, a device includes an integrated circuit and two or more computational units configured to process respective stochastic bit streams in accordance with respective input clocks. Each of the stochastic bit streams comprises sequential sets of data bits, each of the sets of data bits representing a numerical value based on a probability that any bit in the respective set of data bits is one. The respective input clocks for each of the two or more computational units are unsynchronized.

22 Claims, 13 Drawing Sheets

(56) References Cited

U.S. PATENT DOCUMENTS

| | | | | |
|---|---|---|---|---|
| 7,634,749 | B1* | 12/2009 | Cortadella | G06F 17/505 327/153 |
| 8,645,286 | B2* | 2/2014 | Jonas | G06N 7/005 706/10 |
| 9,646,243 | B1 | 5/2017 | Gokmen | |
| 2006/0155551 | A1* | 7/2006 | Ueda | H03K 3/84 331/78 |
| 2007/0110300 | A1* | 5/2007 | Chang | G06T 3/403 382/162 |
| 2008/0294970 | A1 | 11/2008 | Gross et al. | |
| 2009/0228238 | A1* | 9/2009 | Mansinghka | G06N 7/005 702/181 |
| 2011/0154150 | A1 | 6/2011 | Kang et al. | |
| 2011/0231731 | A1 | 9/2011 | Gross et al. | |
| 2013/0007551 | A1 | 1/2013 | Krishnan et al. | |
| 2013/0124164 | A1 | 5/2013 | Jha et al. | |
| 2014/0081899 | A1* | 3/2014 | Jonas | G06N 7/005 706/52 |
| 2017/0109628 | A1 | 4/2017 | Gokmen et al. | |
| 2017/0188174 | A1 | 6/2017 | Lee et al. | |
| 2017/0192752 | A1 | 7/2017 | Bradbury et al. | |
| 2017/0255225 | A1 | 9/2017 | Lilja et al. | |
| 2017/0359082 | A1 | 12/2017 | Riedel et al. | |
| 2018/0196642 | A1* | 7/2018 | Droulez | G06F 7/70 |

OTHER PUBLICATIONS

Mansinghka, Vikash Kumar. "Natively probabilistic computation." PhD diss., Massachusetts Institute of Technology, Department of Brain and Cognitive Sciences, 2009. (Year: 2009).*

Jonas, Eric Michael. "Stochastic architectures for probabilistic computation." PhD diss., Massachusetts Institute of Technology, 2014. (Year: 2014).*

Alaghi et al., "Exploiting Correlation in Stochastic Circuit Design," Proc. IEEE 31 st Int'l Conf. Computer Design, Oct. 2013, 8 pp.

Roberts, "A Brief Introduction to Time-to-Digital and Digital-to-Time Converters," IEEE Trans. Circuits and Systems-II, vol. 57, No. 3, Mar. 2010, pp. 153-157.

Alaghi et al., "Trading Accuracy for Energy in Stochastic Circuit Design" J. Emerging Technologies in Computing Systems, vol. 13, No. 3, Apr. 2017, 30 pp.

Ardakani et al., "Vlsi implementation of deep neural network using integral stochastic computing," IEEE Transactions on Very Large Scale Integration (VLSI) Systems, vol. 25, No. 10, Oct. 2017, pp. 2688-2699.

Fick et al., "Mixed-Signal Stochastic Computation Demonstrated in an Image Sensor with Integrated 2D Edge Detection and Noise Filtering," Proc. IEEE Custom Integrated Circuits Conf. Nov. 2014, pp. 1-4.

Golomb "Signal design for good correlation," 'Chapter 4, Feedback Shift Register Sequences,' Very Large-Scale Integration (VLSI) Systems, IEEE Transactions, 2004, published Jul. 11, 2005, pp. 81-116.

Golomb "Signal design for good correlation," Chapter 5, Signal Design for Good Correlation for Wireless Communication, Cryptography, and Radar, Very Large-Scale Integration (VLSI) Systems, IEEE Transactions, 2004, published Jul. 11, 2005, pp. 117-161.

Hayes, "Introduction to Stochastic Computing and Its Challenges," Proc. 52 nd ACM/EDAC/IEEE Design Automation Conf. Jun. 2015, p. 1-3.

Ichihara et al., "Compact and accurate stochastic circuits with shared random number sources," In Computer Design (ICCD), 2014 32 nd IEEE International Conference, pp. 361-366, Oct. 2014.

International Technology Roadmap for Semiconductors 2.0, 2015, accessed on May 21, 2015 from www.itrs2.net/itrs-reports.html, 78 pp.

Kim, "Dynamic energy-accuracy trade-off using stochastic computing in deep neural networks," In Proceedings of the 53 rd Annual Design Automation Conference, DAC '16, pp. 124:1-124:6, Jun. 2016.

Li, et al., "Using stochastic computing to reduce the hardware requirements for a restricted Boltzmann machine classifier," In Proceedings of the 2016 ACM/SIGDA International Symposium on Field-Programmable Gate Arrays, FPGA '16, Feb. 2016, pp. 36-41.

Liu et al., Architectures for recursive digital filters using stochastic computing, IEEE Transactions on Signal Processing, Jul. 2016, pp. 3705-3718.

Poppelbaum "Stochastic Computing Elements and Systems," Proc. Jt. Computer Conf. Nov. 1967, pp. 635-644.

Murmann, "ADC Performance Survey 1997-2015," [online], accessed on May 21, 2005, available http://web.stanford.edu/murmann/adcsurvey.html, 2015, 58 pp.

Najafi et al., "An Overview of Time-Based Computing with Stochastic Constructs," Ultra-Low-Power Processors, IEEE Computer Society, Nov./Dec. 2017, pp. 62-71.

Onizawa et al., "Analog-to-Stochastic Converter using Magnetic Tunnel Junction Devices for Vision Chips," IEEE Trans. Nanotechnology, vol. 15, No. 5, Sep. 2016, pp. 705-714.

Najafi et al., "A Reconfigurable Architecture with Sequential Logic-Based Stochastic Computing" ACM J. Emerging Technologies in Computing Systems, vol. 13, No. 4, Jun. 2017, 28 pp.

Najafi et al., "Power and Area Efficient Sorting Networks using Unary Processing," Proc. IEEE 35 th Int'l Conf. Computer Design Nov. 2017, pp. 125-128.

Najafi et al., "Time-Encoded Values for Highly Efficient Stochastic Circuits," IEEE Trans. Very Large-Scale Integration (VLSI) Systems, vol. 25, No. 5, May 2017, pp. 1644-1657.

Najafi, "High-Speed Stochastic Circuits Using Synchronous Analog Pulses," Proc. 22 nd Asia and South Pacific Design Automation Conference, Feb. 2017, pp. 481-487.

Najafi et al., "Polysynchronous Clocking: Exploiting the Skew Tolerance of Stochastic Circuits," IEEE Transactions on Computers, vol. 66, No. 10, Oct. 2017, 13 pp.

U.S. Appl. No. 15/869,453, filed Jan. 12, 2018, by Mohammadhassan Najafi.

Cushon et al., "A Min-Sum Iterative Decoder Based on Pulsewidth Message Encoding," IEEE Transactions on Circuits and Systems-II: Express Briefs, vol. 57, No. 11, Nov. 2010, 5 pp.

Brown et al., "Stochastic Neural Computation I: Computational Elements," IEEE Transactions on Computers, vol. 50, Issue 9, Sep. 2001, 15 pp.

Jenson et al., "A Deterministic Approach to Stochastic Computation," presentation acceptance at the International Workshop on Logic and Synthesis, Nov. 10, 2016, 8 pp.

Jenson et al., "A Deterministic Approach to Stochastic Computation," submitted to the 2016 International Conference on Computer Aided Design, Jun. 10, 2016, 8 pp.

Li et al., "A Stochastic Reconfigurable Architecture for Fault-Tolerant Computation with Sequential Logic," 30th International Conference on Computer Design, IEEE, Sep. 30-Oct. 3, 2012, 6 pp.

Qian et al., "Digital yet Deliberately Random: Synthesizing Logical Computation on Stochastic Bit Streams," Dissertation from the University of Minnesota, Jul. 2011, 185 pp.

Qian et al., "Synthesizing Logical Computation on Stochastic Bit Streams," Proceedings of IEEE, 2011, (Applicant points out, in accordance with MPEP 609.04(a), that the year of publication 2011, is sufficiently earlier than the effective U.S. filing date, so that the particular month of publication is not in issue.) 8 pp.

Qian et al., "The Synthesis of Robust Polynomial Arithmetic with Stochastic Logic," 45 Conference of Design Automation, IEEE, Jun. 8-13, 2008, 6 pp.

Tehrani et al., "Majority-Based Tracking Forecast Memories for Stochastic LDPC Decoding," Transactions on Signal Processing, vol. 58, No. 9, IEEE, Sep. 2010, 14 pp.

U.S. Appl. No. 15/618,530, filed Jun. 9, 2017, by Marcus Riedel.

Zhu et al., "Binary Stochastic Implementation of Digital Logic," Proceedings of the 2014 AVM/SIGDA International Symposium on Field-programmable Gate Arrays, Feb. 2014, 9 pp.

Alaghi et al., "Fast and Accurate Computation using Stochastic Circuits," Design Automation and Test in Europe Conference and Exhibition, Mar. 24-28, 2014, IEEE online Apr. 21, 2014, 4 pp.

(56) References Cited

OTHER PUBLICATIONS

Alaghi et al., "Stochastic Circuits for Real-Time Image-Processing Applications," Proceedings of the 50th Annual Design Automation Conference, May 29-Jun. 7, 2013, 6 pp.
Alaghi et al., "Survey of Stochastic Computing," ACM Transactions on Embedded Computing Systems, vol. 12, No. 2s, Article 92, May 2013, 19 pp.
Chapiro, "Globally-Asynchronous Locally-Synchronous Systems," Dissertation submitted to the Department of Computer Science, Report No. STAN-CS-84-1026, Stanford University, Oct. 1984, 138 pp.
Wilhelm et al., "Stochastic Switching Circuit Synthesis," Information Theory, Jul. 6-11, 2008, IEEE online Aug. 8, 2008, 16 pp.
Choi et al., A Magnetic Tunnel Junction Based True Random Number Generator with Conditional Perturb and Real-Time Output Probability Tracking, Electron Devices Meeting, Dec. 15-17, 2014, available from IEEE Feb. 23, 2015, 4 pp.
Friedman., "Clock Distribution Networks in Synchronous Digital Integrated Circuits," IEEE, vol. 89, No. 5, May 2001, 28 pp.
Gaines, "Stochastic Computing Systems, Chapter 2," Advances in Information System Science, 1969, 69 pp. (Applicant points out, in accordance with MPEP 609.04(a), that the year of publication, 1969, is sufficiently earlier than the effective U.S. filing date, Mar. 3, 2017, so that the particular month of publication is not in issue.).
Jiang et al., "Design of Mixed Synchronous/Asynchronous Systems with Multiple Clocks," IEEE Transactions on Parallel and Distributed Systems, vol. 26, No. 8, Aug. 2015, 14 pp.
Tehrani et al., Fully Parallel Stochastic LDPC Decoders, Transactions on Signal Processing, vol. 56, No. 11, IEEE, Nov. 2008, 12 pp.
Li et al., "A Low Power Fault-Tolerance Architecture for the Kernal Density Estimation Based Image Segmentation Algorithm," International Conference on Application Specific Systems, Architectures and Processors, Sep. 11-14, 2011, available from IEEE Oct. 13, 2011, 8 pp.
Li et al., "An FPGA Implementation of a Restricted Boltzmann Machine Classifier Using Stochastic Bit Streams," Sep. 10, 2015, 2 pp.
Li et al., "Computation on Stochastic Bit Streams Digital Image Processing Case Studies," Transactions on Very Large Scale Integration (VLSI) Systems, vol. 22, Issue 3, Mar. 2014, available from IEEE Apr. 15, 2013, 14 pp.
Li et al., "The Synthesis of Complex Arithmetic Computation on Stochastic Bit Streams Using Sequential Logic," International Conference on Computer-Aided Design, Nov. 2012, 9 pp.
Liang et al., "Stochastic Modeling and Optimization in a Microgrid: A Survey," Energies, Mar. 31, 2014, 24 pp.
Mansinghka et al., "Stochastic Digital Circuits for Porbabilistic Inference," Computer Science and Artificial Intelligence Laboratory Technical Report, Massachusetts Institute of Technology, Nov. 23, 2008, 12 pp.
Tehrani et al., "Stochastic Decoding of LDPC Codes," Communications Letters, vol. 10. No. 10, IEEE, Oct. 2006, 3 pp.
Naderi et al., "Delayed Stochastic Decoding of LDPC Codes," Transactions on Signal Processing, vol. 59, No. 11, IEEE, Nov. 2011, 10 pp.
Najafi et al., "A Fast Fault-Tolerant Architecture for Sauvola Local Image Thresholding Algorithm Using Stochastic Computing," Transactions on Very Large Scale Integration (VLSI) Systems, vol. 24. No. 2, IEEE, Feb. 2016, 5 pp.
Najafi et al., "Polysynchronous Stochastic Circuits," Design Automation Conference, Jan. 25-28, 2016, IEEE online Mar. 10, 2016, 7 pp.
Najafi et al., "Polysynchrous Clocking: Exploiting the Skew Tolerance of Stochastic Circuits," IEEE Transactions on Computers, vol. PP, Issue 99, Apr. 25, 2017, 11 pp.
Qian et al., "An Architecture for Fault-Tolerant Computation with Stochastic Logic," IEEE, Feb. 2011, 14 pp.
Qian et al., "The Synthesis of Stochastic Circuits for Nanoscale Computation: Chapter 18," International Journal of Nanotechnology and Molecular Computation, Oct.-Dec. 2009, 16 pp.
Ranjbar et al., "Using Stochastic Architectures for Edge Detection Algorithms," 23rd Iranian Conference on Electrical Engineering, May 10-14, 2015, available from IEEE Jul. 2, 2015, 6 pp.
Riedel, "Polysynchronous Clocking for Molecular Computing," MBMC Workshop, Dec. 4, 2015, 37 pp.
Tang et al., "True Random Number Generator Circuits Based on Single- and Multi-Phase Beat Frequency Detection," Proceedings of the Custom Integrated Circuits Conference, Sep. 15-17, 2014, available from IEEE Nov. 6, 2014, 4 pp.

\* cited by examiner

POLYSYNCHRONOUS STOCHASTIC CIRCUITS

This application claims the benefit of U.S. Provisional Patent Application No. 62/303,100 (filed Mar. 3, 2016), the entire content being incorporated herein by reference.

GOVERNMENT INTEREST

This invention was made with government support under CCF-1408123 awarded by the National Science Foundation. The government has certain rights in the invention.

TECHNICAL FIELD

The invention relates to electronic circuits and, in particular, clock distribution for electronic circuits.

BACKGROUND

All electronic systems are inherently asynchronous in nature. By carefully choreographing transitions with clock signals, asynchronous circuitry can be adapted to appear to behave synchronously. Such synchronism brings significant advantages: it greatly simplifies the design effort; also, with predictable timing, one can make performance guarantees. However, synchronism comes at a significant cost: one must create a clock distribution network (CDN) that supplies a common reference signal to all synchronous components. The CDN distributes the clock signal from a single oscillator to stateholding components, such as flip-flops. Historically, the primary design goal for CDNs has been to ensure that a single clock signal arrives at every synchronous component at precisely the same time to ensure zero clock skew. Another typical design goal for CDNs is to maintain signal integrity while distributing the clock widely. In the ideal case, transitions in the clock signal should arrive at all state-holding elements at precisely the same moment (so there is zero clock uncertainty). Achieving this synchronization and signal integrity can be difficult and costly in terms of design effort and resources. In modern large-scale integrated circuits, the CDN accounts for significant area, consumes significant power, and often limits the overall circuit performance. With increasing variation in circuit parameters, designing CDNs with tolerable clock skew is becoming a major design bottleneck.

Completely asynchronous design methodologies have been studied for decades, but these have never gained widespread acceptance. Instead of synchronizing transitions with a global clock, asynchronous systems are organized as a set of components that communicate using handshaking mechanisms. One drawback of asynchronous methodologies is the overhead and silicon real estate required for the handshaking mechanisms. Circuits with multiple independent clock domains, such as circuits that are globally asynchronous, but locally synchronous (GALS), have become common. GALS architectures consume less dynamic power and can achieve better performance than architectures with a single clock domain. However, the circuitry for domain crossings is complex and problematic. Splitting the clock domains reduces the cost of the distribution network, but relatively complex circuitry for handshaking is needed at domain crossings, so the splitting is only performed at a coarse level.

SUMMARY

Techniques are described for polysynchronous stochastic circuits that can operate without a rigorous clock distribution network. This disclosure describes polysynchronous clocking of stochastic circuits that allows timing requirements of a clock distribution network (CDN) of an integrated circuit or electronic system to be relaxed such that the timing elements may be reduced or eliminated because the arrival of the global clock at the respective computation units need not be synchronized. In other examples, the techniques allow local clocks to be independently generated, thus allowing splitting of clock domains within an integrated circuit or electronic system at a very fine level, e.g., down to the level of a handful of gates if desired. Each clock domain is synchronized with an inexpensive clock signal that may be generated locally and independent of other clock domains.

As an advantage, with a stochastic representation described herein, computational units can tolerate clock skew in the arrival time of their inputs. This stems from the fact that the stochastic representation is uniform: all that matters in terms of the value that is computed is the fraction of time that the signal is high. With stochastic representation, the correct value is computed even when the inputs are misaligned temporally. Accordingly, adopting the stochastic paradigm obviates the need for a global clock signal and the associated CDN. Instead, one can simply use local clock signal generators throughout the network or a relaxed CDN. This approach may be called polysynchronous stochastic to distinguish it from asynchronous and GALS methodologies.

In some examples, a device includes an integrated circuit and two or more computational units configured to process respective stochastic bit streams in accordance with respective input clocks. Each of the stochastic bit streams comprises sequential sets of data bits, each of the sets of data bits representing a numerical value based on a probability that any bit in the respective set of data bits is one. The respective input clocks for each of the two or more computational units are unsynchronized.

In some examples, a method of operating an integrated circuit with two or more computational units includes receiving, at each of the two or more computational units, respective stochastic bit streams. The method further includes receiving, at each of the two or more computational units, clock signals from respective input clocks. The method further includes processing, at each of the two or more computational units, the respective stochastic bit streams in accordance with the respective input clocks. Each of the stochastic bit streams comprises sequential sets of data bits, each of the sets of data bits representing a numerical value based on a probability that any bit in the respective set of data bits is one. The respective input clocks for each of the two or more computational units are unsynchronized.

This disclosure provides some background on stochastic computing and introduces polysynchronous stochastic concepts. This disclosure demonstrates how to implement basic operations for polysynchronous circuits, describes experimental methodology, and presents experimental results.

DETAILED DESCRIPTION

Figure 1A:
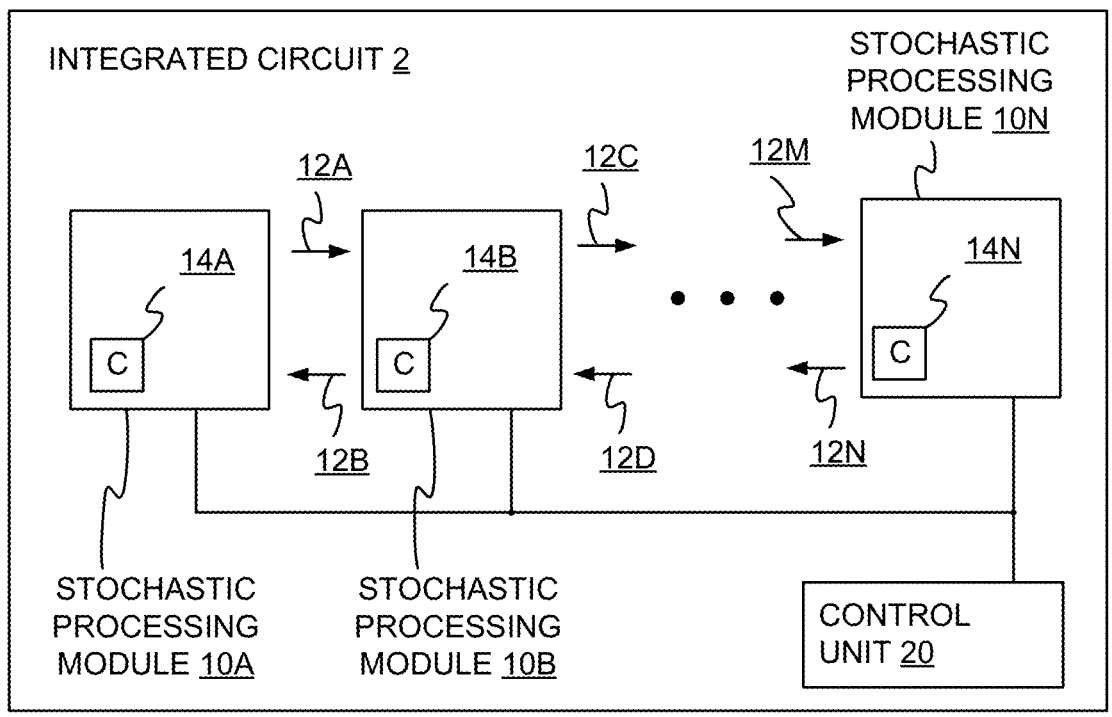
FIG. 1A illustrates an integrated circuit with stochastic processing modules and polysynchronous local clocks.

This disclosure introduces techniques and circuits for polysynchronous clocking in which stochastic computational units are utilized and clock domains can be split at a very fine level. A variety of techniques are described. In one example implementation, each domain is synchronized by an inexpensive local clock, such as an inverter ring. This obviates the need for an expensive global clock distribution network (CDN). In a second implementation, a global CDN is used but the clock skew requirements between domains are relaxed due to the use of SC circuits. This allows for a higher working frequency and so lower latency.

Various advantages of the described techniques, such as the area, speed, and energy saving advantages, are quantified. Experimental results show that replacing a global CDN with local clocks significantly improves the area, latency, and energy consumption for large SC designs. For smaller SC designs, a "relaxed" global CDN is a more efficient choice. Circuits designed with any of the polysynchronous approaches described herein are as tolerant of errors as conventional synchronous stochastic circuits yet reduce complexity, cost and/or power requirements.

In general, there are two kinds of variations that lead to uncertainty in the arrival time of the clock edge at sequential circuit elements of the conventional binary radix circuits: spatial and temporal. Spatial variations, known as skew, affect the arrival of the various clock edges at the sequential elements within a single clock cycle. Temporal variations, known as jitter, affect the arrival time of the clock edges at the sequential elements across different clock cycles.

There are a number of factors that contribute to uncertainty in the conventional binary radix implementations: differences in line lengths from the clock source to clocked registers; differences in delays of distributed buffers; differences in passive interconnect parameters, such as line resistivity, dielectric constants and thickness, via/contact resistance, line and fringing capacitance, and line dimensions; and differences in active device parameters, such as MOS threshold voltages and channel mobilities, which affect the delay of active buffers.

Even when designed to be zero, environmental and processing variations can nonetheless lead to significant amounts of clock uncertainty in the conventional deterministic binary radix circuits. Various strategies are used to minimize the uncertainty in the delivery of clock signals. For instance, buffers and inverters can be inserted to balance the delays between the clock source and the clock sinks. However, this costs—both in area and design effort.

In a deterministic design, skew can limit circuit performance, since a circuit must be clocked at a lower frequency to tolerate it. If unaccounted for, clock skew can cause timing-related errors. There is a designer's rule of thumb that clock skew should be less than 10 percent of the clock period. As clock frequency goes up, more complex CDNs are required to keep skew at a constant fraction of the clock period. Increasing die size, clock loads, and process variability magnify the challenge.

In summary, for modern integrated circuits, the global CDN is a major bottleneck in terms of design effort, area, and performance. Polysynchronous stochastic computing techniques described herein offer skew tolerance, which can be used to mitigate the costs: either the global CDN can be eliminated entirely; or one can design a much less costly global CDN that tolerates skew.

Described herein are polysynchronous stochastic circuits that can operate without a rigorous clock distribution network because individual bits in stochastic circuits are not as critical as the individual bits in conventional circuits. Information in a stochastic network is expressed as a percentage of the stream that is high (1 in a binary representation) or low (0). As further described herein, the stochastic circuits can tolerate clock skew, allowing for the removal of the timing requirements of a clock distribution network. In some examples, polysynchronous stochastic circuits are described that may operate with a global clock but with relaxed clock arrival requirements. Polysynchronous stochastic circuits described herein may also operate with local clocks but without burdensome handshaking procedures.

FIG. 1A illustrates an integrated circuit with a plurality of stochastic processing modules 10A-10N having respective polysynchronous local clocks 14. Integrated circuit 2 may comprise numerous stochastic processing modules 10A-10N. In general, each stochastic processing module 10 represents a functional component, e.g., computational unit, designed to perform operations, such as arithmetic operations, image processing, signal processing, field-programmable gate arrays (FPGAs), parallel data processing, convolutional neural networks, speech processing, sensors and the like. Each stochastic processing module 10 may include logic gates, memory units, multiplexers, or other devices that processes input information and generates output information.

As shown in the example of FIG. 1A, stochastic processing modules 10 exchange data via bit streams 12A-12N. For example, stochastic processing module 10A may output stochastic bit stream 12A to stochastic processing module 10B, where it may serve as an input bit stream. Stochastic processing module 10B may utilize stochastic bit streams 12A and 12D as inputs and may generate stochastic bit streams 12B and 12C as outputs. Stochastic processing module 10N may take stochastic bit stream 12M as an input and generate stochastic bit stream 12N as an output. In general, stochastic bit streams 12 use a set of 0's and 1's to express a fractional number between 0 and 1. For examples, a bit stream carrying a 10 bit sequence of 0,0,0,1,1,0,1,0,0,0 may represent the value 0.3 because 30% of the bits are 1. Thus, for any set of N bits, the probability that any bit in the set of bits is 1 corresponds to the value represented by that set of bits in the stochastic bit stream.

As shown in FIG. 1A, each of the stochastic processing modules 10A-10N may be connected to and driven by one or more local clocks 14A-14N. For example, local clock 14A may be generated by local logic associated with and proximate to stochastic processing module 10A, as depicted in FIG. 1A. Each clock signal 14 determines the frequency at which the respective stochastic processing module 10 operates on stochastic bit streams 12. As explained herein, the timing requirements of the arrival of the clock signals from local clock 14 at the respective stochastic processing module 10 can be significantly relaxed without impacting operation on stochastic bit streams 10.

In general, control unit 20 controls operations of stochastic processing modules 10 including delivery of stochastic bit streams 12 to and from stochastic processing modules 10. For example, control unit 20 may be responsible for directing traffic among stochastic bit streams 12.

The techniques described herein utilize and leverage stochastic computation, where signal values are encoded as random bit streams. The techniques are illustrated with the synthesis of circuits for applications in signal and image processing. Logical computation is performed on randomized bit streams, with signal values encoded in the statistics of the streams: a real value x in the interval [0, 1] is represented by a stream with bits each having independent probability x of being 1.

Compared to a binary radix representation, such a stochastic representation is not very compact. With M bits, a binary radix representation can represent $2^M$ distinct numbers. To represent real numbers with a resolution of $2^{-M}$, i.e., numbers of the form $$\frac{a}{2^M}$$

for integers a between 0 and $2^M$, a stochastic representation requires a stream of $2^M$ bits. The two representations are at opposite ends of the spectrum: conventional binary radix is a maximally compressed, positional encoding; a stochastic representation is an uncompressed, uniform encoding.

A stochastic representation, although not very compact, has an advantage over binary radix in terms of error tolerance. Suppose that the environment is noisy: bit flips occur and these afflict all the bits with equal probability. With a binary radix representation, in the worst case, the most significant bit gets flipped, resulting in a large error. In contrast, with a stochastic representation, all the bits in the stream have equal weight. A single flip results in a small error. This error tolerance scales to high error rates: multiple bit flips produce small and uniform deviations from the nominal value. More compelling than the error tolerance is the simplicity of the designs in the stochastic paradigm. Complex functions can be implemented with remarkably simple logic. Multiplication can be performed with a single AND gate. Functions such as polynomial approximations of trigonometric functions can be implemented with less than a dozen gates. Over a wide range of arithmetic functions, a reduction in area of 50× or 100× compared to conventional implementations is common.

Figure 1B:
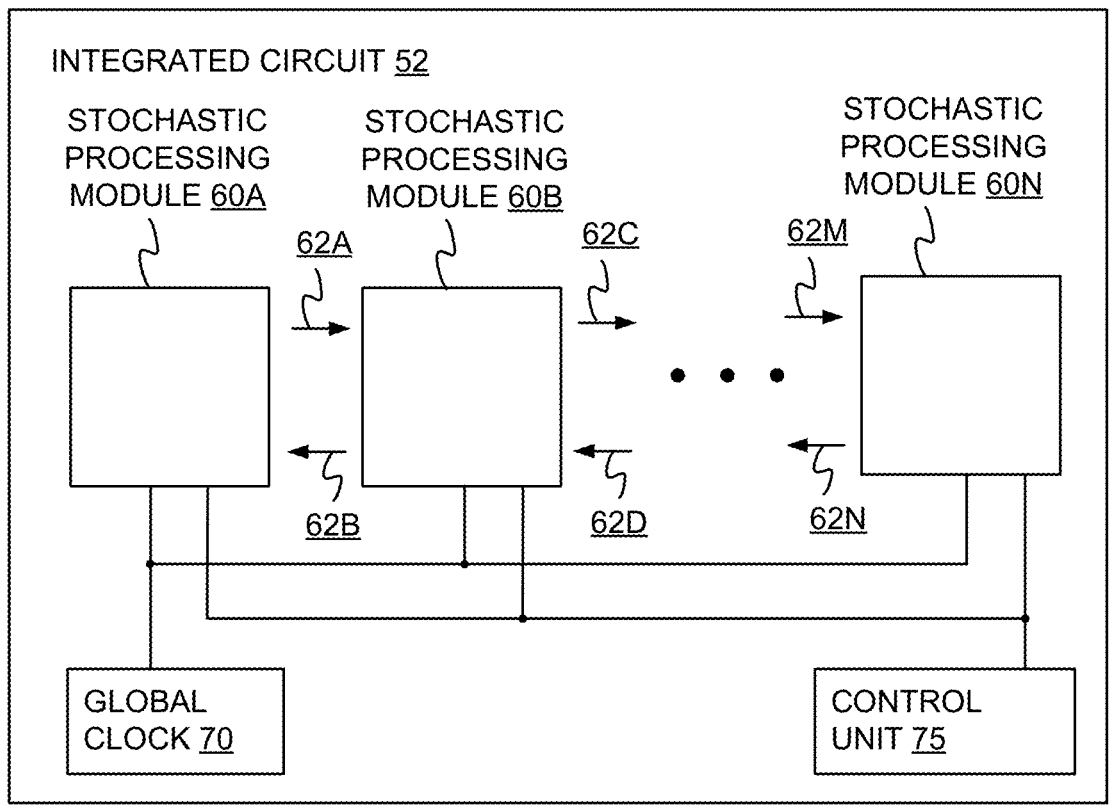
FIG. 1B illustrates an integrated circuit with stochastic processing modules and an unsynchronized, or loosely synchronized, global clock.

FIG. 1B illustrates another example integrated circuit with stochastic processing modules 60 and an unsynchronized, or loosely synchronized, global clock 70. Integrated circuit 52, stochastic processing modules 60A-60N, bit streams 62A-62N, and control unit 75 may be similar to stochastic processing modules 10, bit streams 12, and control unit 20 in FIG. 1A. Global clock 70 is provided to stochastic processing modules 60 by an inexpensive clock distribution network with no timing requirements or significantly relaxed timing requirements. That is, in accordance with the techniques described herein, the timing requirements that govern the arrival of clock signals from global clock 70 at each of stochastic processing modules 60 can be relaxed. The stochastic nature of integrated circuit 52 may remove the need for a precise clock distribution network because signal values are expressed as a percentage of time that stochastic bit stream 62N is high, or one in a binary representation.

In general, the techniques described herein allow for relaxed timing requirements of the local clocks 14 (FIG. 1A) or global clock 70 (FIG. 1B) at the respective stochastic processing module 10, 60 without impacting operation on stochastic bit streams 10. In other words, unlike conventional circuits, stochastic processing modules can tolerate differences in the timing of the clock signals. For example, as demonstrated herein, stochastic processing module 10, 60 are configured to tolerate (function properly) even in the event of significant misalignment between clock edges and/or significant deviation in clock period. Such differences are generally referred to herein as clock skew.

As one example, clock skew includes the misalignment in time of clock edges, which may be defined as the percentage variation between the arrivals of active clock signals at different stochastic processing modules 10. For example, if the clock period of two clock signals is 500 picoseconds, and the clock signals arrive at two different stochastic processing modules 100 picoseconds apart, the clock skew between the clock signals can be viewed as 20% of the period. As explained herein, stochastic processing modules 10, 60 are able to tolerate a misalignment of clock signals in excess of 50%, 90% or even 100%.

As a second example, the term "clock skew" as used herein also encompasses misalignment of two clocks due to the different periods of the two clocks. For example, as discussed below with respect to experimental results, stochastic processing module 10, 60 are able to tolerate significant deviations in the periodicity of the clock signals. For example, clock signal 14A may have a period of 2 ns while locally generated clock signal 14B may have a period of 3 ns. In this example, the clock skew (i.e., difference in period) may be referred to as 50%. That is, clock signal 14B has a period that is 50% greater than the period of clock signal 14A. As explained herein, stochastic processing modules 10, 60 are able to tolerate deviations of periods in excess of 50%, 90% or even 100%.

Clock skew may also be represented in terms a number of data bits associated with the overall clock misalignment. For example, if stochastic bit streams 12 comprise sequential sets of N data bits, each of the sets of N data bits may represent a numerical value based on a probability that any bit in the respective set of data bits is high (one) (e.g., set to one versus a zero). In the examples depicted in FIGS. 2 and 4, each value in a bit stream 12 is represented as a sequence of ten (N=10) bits. As explained herein, each of the respective input clocks 14 for the stochastic processing modules 10 can be polysynchronous and yet stochastic processing modules 10 operate correctly on bit streams 12. That is, stochastic processing modules 10 are able to tolerate a clock skew, such as a clock skew even up to and more than 100%. In this case, the data values within bit streams 12 may be misaligned, also referred to herein as word length skew. Stochastic processing modules 10 may be able to tolerate word length skew that is in excess of at least 1 bit, or more, in the stochastic bit streams 12, where the word length skew represents a difference between arrival times for the same bit position of the two or more input bit streams 12. For example, stochastic processing modules 10 may be able to tolerate data values that are misaligned by at least 1 bit in the stochastic bit streams 12. In this way, stochastic processing modules 10 are able to still operate correctly even though significant timing differences/skew may exist with respect to processing of stochastic bit streams 12, and the degree of tolerance of timing differences may increase as large data word lengths (N) are used.

The techniques described herein may provide numerous advantages. As described, a clock distribution network for an integrated circuit may be altogether avoided (e.g., FIG. 1A) or may be implemented with fewer timing elements and much less rigid timing requirements (FIG. 1B). Moreover, a polysynchronous stochastic circuit in accordance with the techniques described herein may occupy less space than a conventional circuit and may consume less power. Removing or relaxing the clock distribution network may result in fewer components in a circuit. A polysynchronous stochastic circuit may also offer improved accuracy in some situations by introducing more randomness.

In the paradigm of stochastic computing (SC), circuits operate on random bit streams where the signal value is encoded by the probability of obtaining a one versus a zero. In the unipolar stochastic representation, each real-valued number x (0≤x≤1) is represented by a sequence of random bits, each of which has probability x of being one and probability 1−x of being zero. In the bipolar representation, each real-valued number y (−1≤y≤1) is represented by a sequence of random bits, each of which has probability $$\frac{y+1}{2}$$

of being one and probability $$1 - \frac{y+1}{2}$$

of being zero.

This representation is much less compact than a binary radix. However, complex operations can be performed with very simple logic. In particular, arithmetic functions, consisting of operations like addition and multiplication can be implemented very efficiently. Complex functions, such as exponentials and trigonometric functions, can be computed through polynomial approximations. Because the bit stream representation is uniform, with all bits weighted equally, circuits designed this way are highly tolerant of soft errors such as bit flips.

The stochastic representation is a uniform fractional representation: all that matters is the fraction of time that the signal is high. Consequently, precise synchronization between the arrival time of input values to logic gates does not matter, as described further herein.

Figure 10:
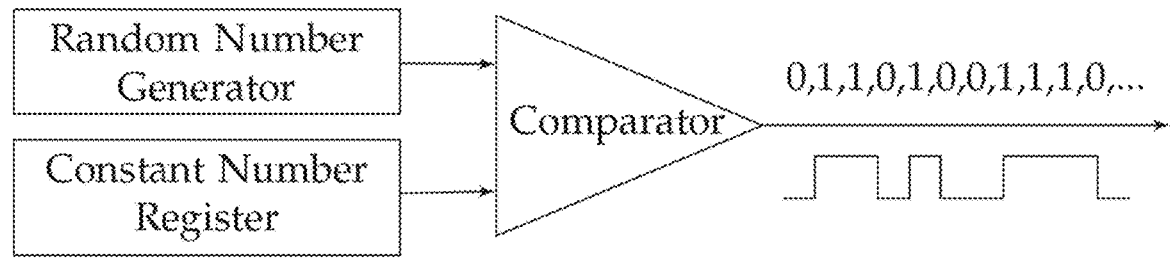
FIG. 10 illustrates a stochastic number generator configured to generate a stochastic bit stream.

Referring to FIG. 10, a typical "random number generator" for SC is usually a linear-feedback shift register (LFSR), which produces high quality pseudo-randomness. In this approach, the period of the clock feeding the generator corresponds to the duration of a single bit in the output stream. Assuming that the pseudo-random numbers are uniformly distributed between $0 \ldots 2^M-1$, the value stored in the constant number register should be $2^M \cdot x$. In the output, each bit is one with pseudo-probability $2^M \cdot x/2^M = x$.

Figure 2:
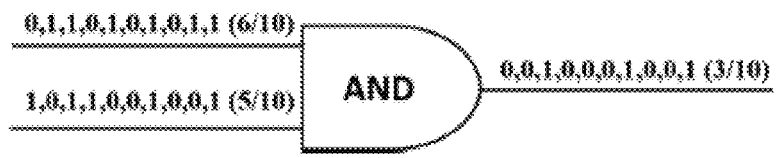
FIG. 2 illustrates an example of stochastic multiplication using an AND gate.
Figure 3:
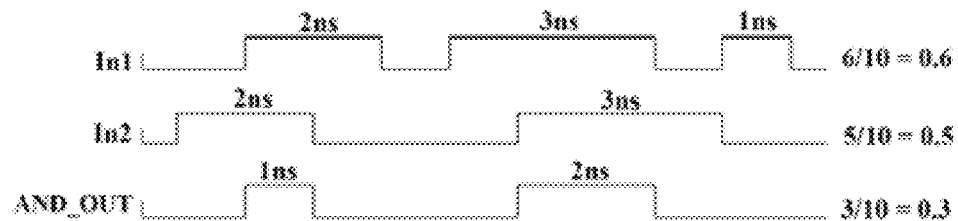
FIG. 3 illustrates stochastic multiplication using an AND with unsynchronized bit streams.

In a stochastic system, multiplication can be implemented using a standard AND gate for the unipolar coding format and an XNOR gate for the bipolar coding format. FIG. 2 shows the multiplication of two 10-bit unipolar stochastic streams using an AND gate. The value represented by a bit stream is the time that the signal is high divided by the total length of the stream. FIG. 3 illustrates an example of multiplying two unsynchronized bit streams representing 0.6 and 0.5. As shown, the value represented by the bit stream at the output of the AND gate is 0.3, the value expected when multiplying 0.6 by 0.5.

Figure 4:
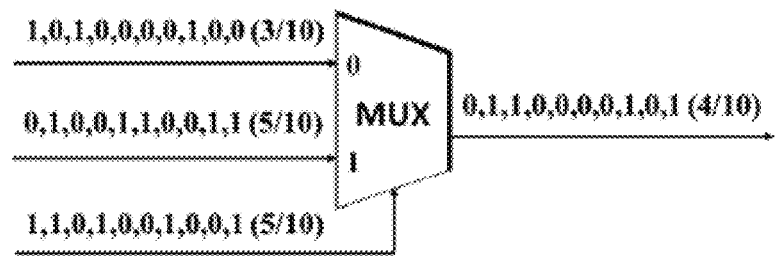
FIG. 4 illustrates an example of stochastic scaled addition using a MUX unit.

For scaled addition and subtraction, stochastic values are restricted to the interval [0, 1] (in the unipolar case) or the interval [−1, 1] (in the bipolar case). A stochastic circuit cannot perform addition or subtraction directly, since the result might lie outside these intervals. However, a stochastic circuit can perform scaled addition and subtraction. These operations can be performed with a multiplexer (MUX). FIG. 4 illustrates the operation that is equivalent to ½A+½B.

Figure 5:
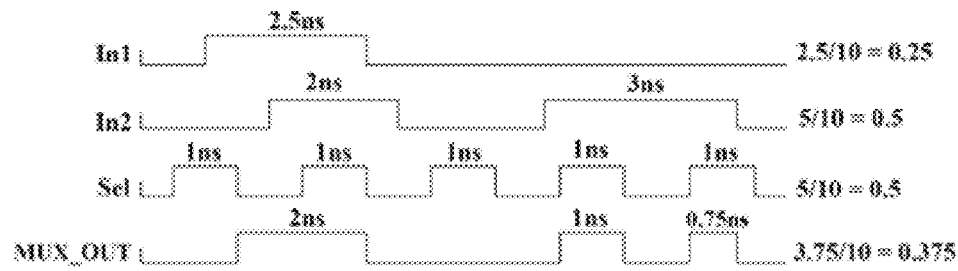
FIG. 5 illustrates stochastic scaled addition using a MUX with unsynchronized bit streams.

FIG. 5 illustrates another example of scaled addition, this time on two unsynchronized bit streams representing 0.25 and 0.5. As expected, the output is a bit stream representing 0.375, the result of the scaled addition.

Figure 11A:
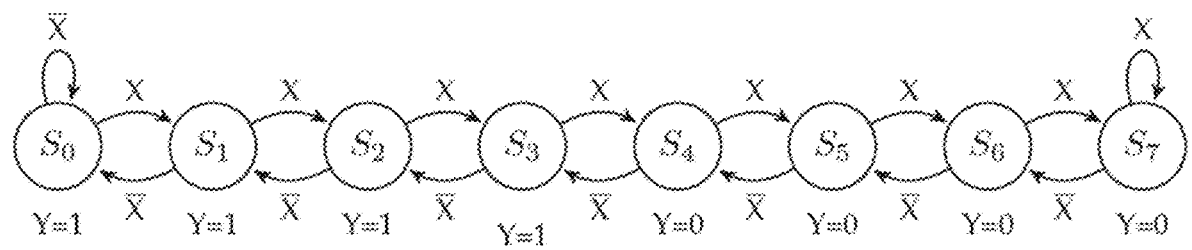
FIGS. 11A-11C are state transition diagrams for a finite-state machine implementing a stochastic exponentiation function, a stochastic tan h function, a stochastic absolute value function.
Figure 11B:
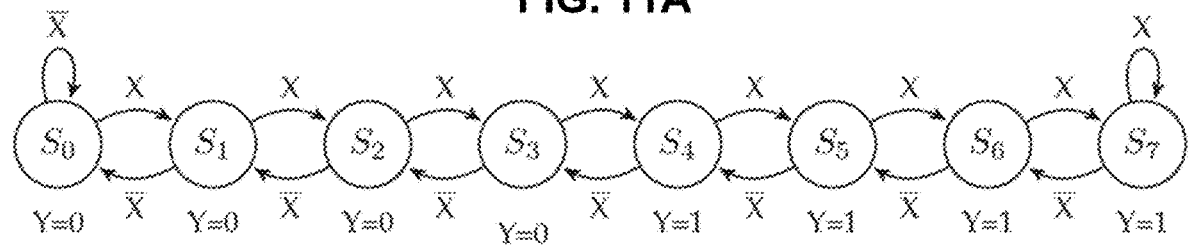
Figure 11C:
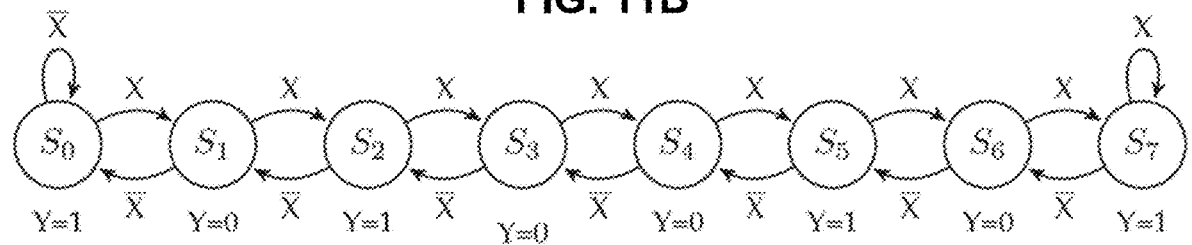

More complex functions can be implemented in SC using finite state machines (FSMs). Stochastic implementations include the exponentiation function, the tan h function, and an FSM-based stochastic absolute value function. The state transition diagrams of the FSMs implementing these functions are shown in FIGS. 11A-11C. Assuming that the input to these FSMs is a random signal that is high a fraction X of the time, the output signal Y converges to expected value: a fraction of time at high equal to exp(X); tan h(X) and abs(X). Note that these FSMs only differ in how the outputs are computed from the current state. Transition diagrams with 8 states are shown here; these can readily be generalized to FSMs with more states.

The circuits utilizing the polysynchronous stochastic computing techniques described herein can be applied to a wide variety of applications, ranging from sensing, image capture and processing and signal processing to decoding of low-density parity check codes. This disclosure describes example stochastic implementations of various digital image processing techniques to evaluate the polysynchronous stochastic paradigm: Robert's cross edge detection, median filter based noise reduction circuit, and image segmentation based on stochastic kernel density estimation.

Figure 6B:
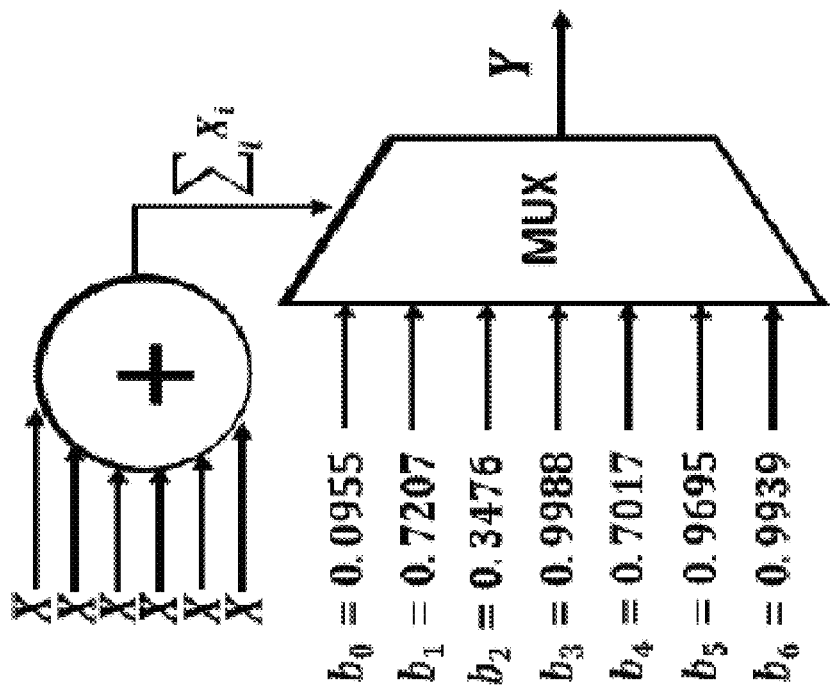
FIG. 6B illustrates a stochastic implementation of the gamma correction function using a MUX-based Bernstein polynomial architecture.
Figure 6A:
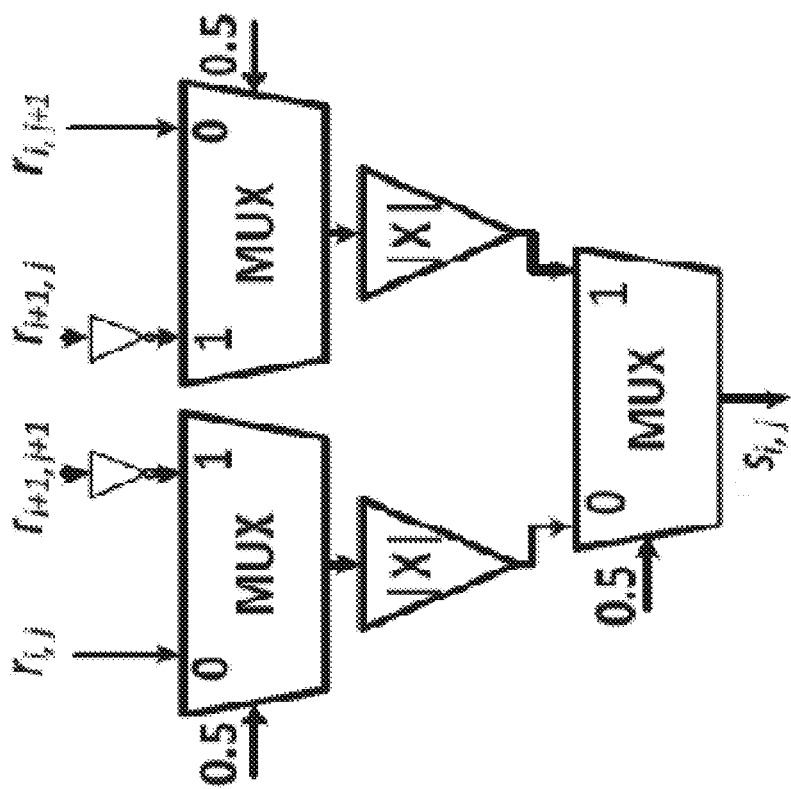
FIG. 6A illustrates a stochastic implementation of the Robert's Cross edge detection algorithm.
Figure 12:
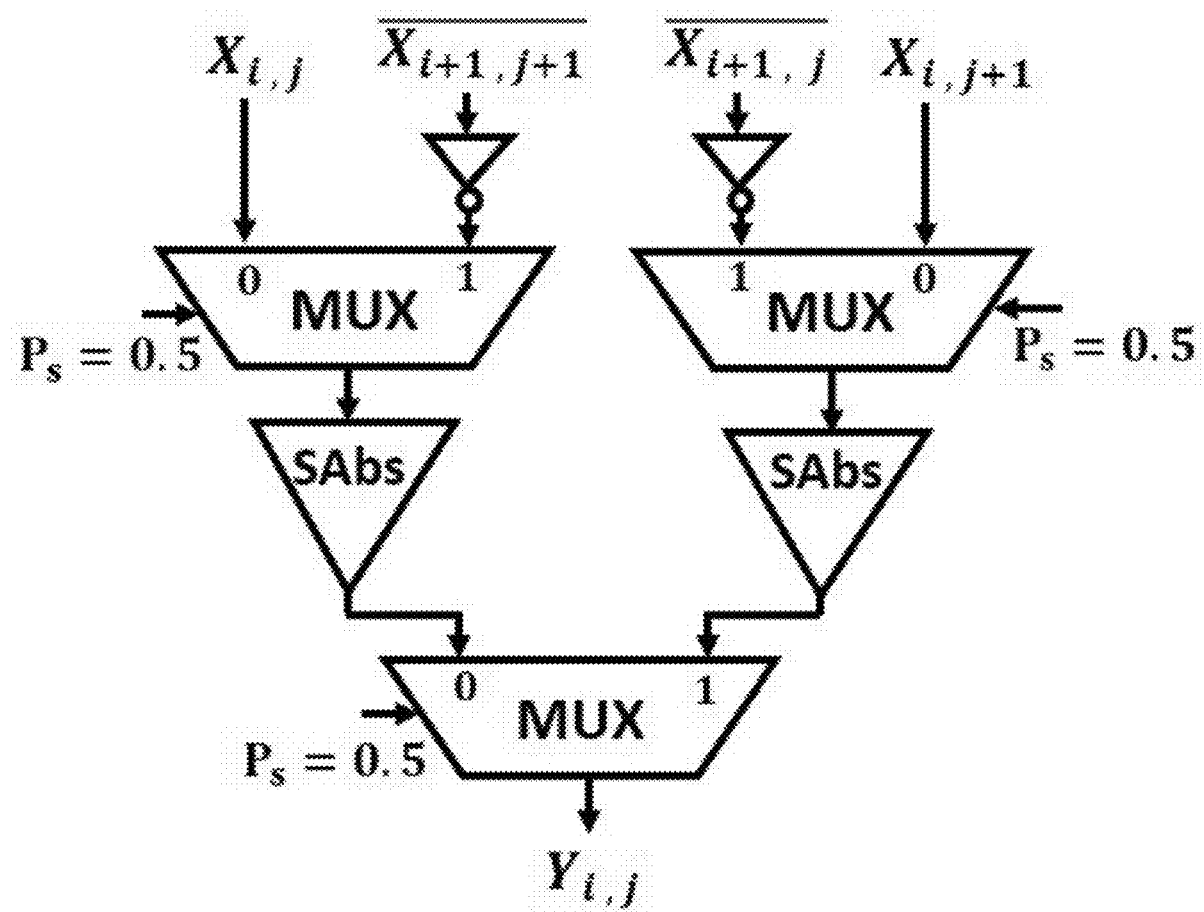
FIG. 12 illustrates a stochastic implementation of the Robert's cross edge detection algorithm.

An example stochastic implementation of Robert's Cross edge detection algorithm that may be utilized in an image processing device of a sensor or other device is shown in FIG. 6A. Each operator consists of a pair of 2×2 convolution kernels that process an image pixel based on its three neighbors as follows:

$$S_{i,j} = \frac{1}{2} \times \left( \frac{1}{2} |r_{i,j} - r_{i+1,j+1}| + \frac{1}{2} |r_{i,j+1} - r_{i+1,j}| \right)$$

where $r_{i,j}$ is the value of the pixel at location (i,j) of the original input image and $S_{i,j}$ is the output value computed for the same location in the output image. In the example circuit of FIG. 12, three multiplexers perform addition and subtraction, while two finite-state-machine based stochastic circuits perform the required absolute value operations. Since this circuit works with signed values, all streams should be in the bipolar format.

Figure 13:
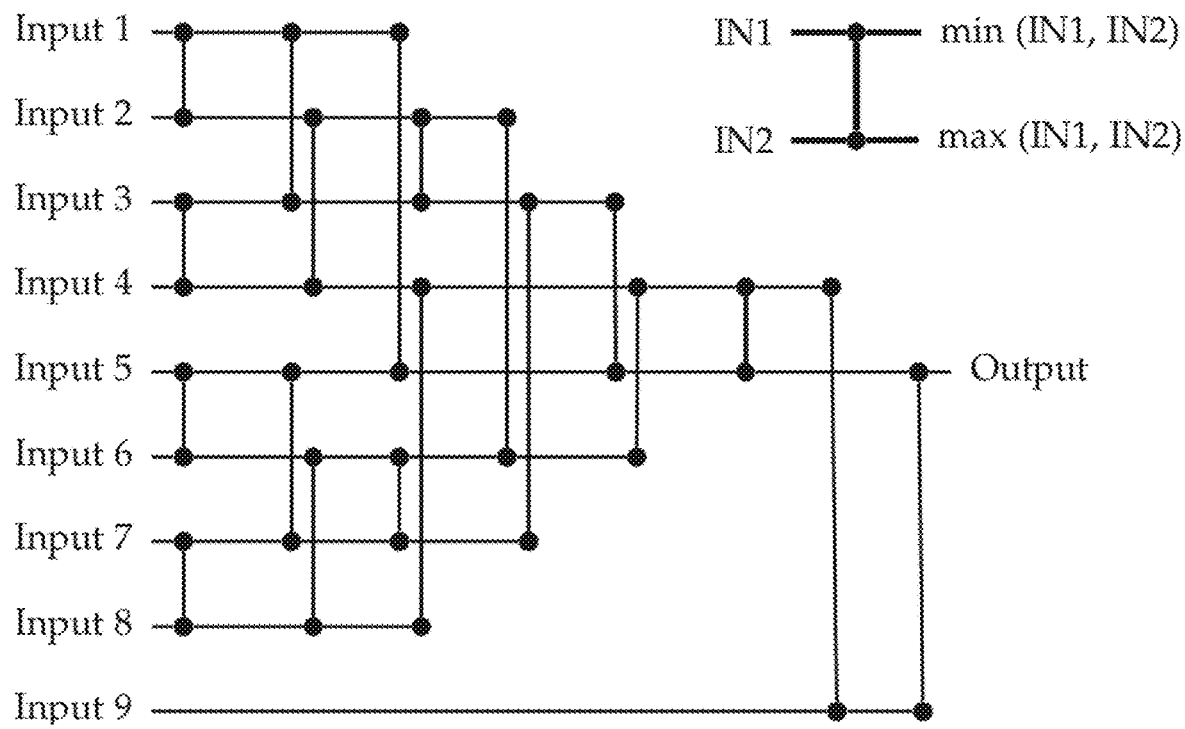
FIG. 13 illustrates a hardware implementation of the 3×3 median filter based on a sorting network.
Figure 14:
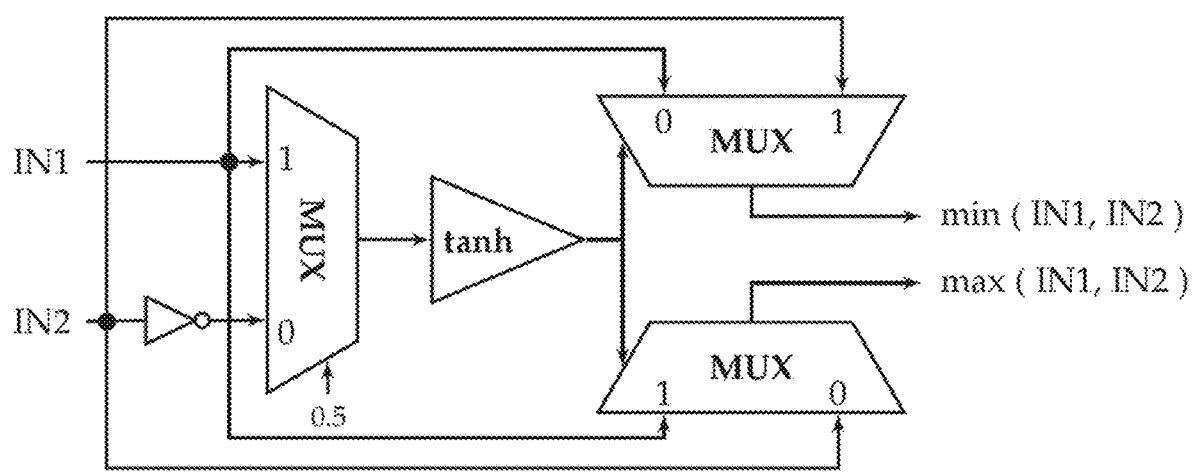
FIG. 14 illustrates a stochastic implementation of basic sorting unit.

As another example, a median filter used in digital processing circuits operates to replace each pixel of an input image with the median of neighboring pixels. For certain types of random noise, the median filter provides excellent noise-reduction capabilities. An example hardware implementation of the 3×3 median filter based on a sorting network is shown in FIG. 13. Each basic sorting unit used in this circuit is implemented with the circuit presented in FIG. 14. In total, the example median filter circuit requires 19 basic sorting units (57 MUX units and 19 FSM-based stochastic tan h circuits.)

Figure 15:
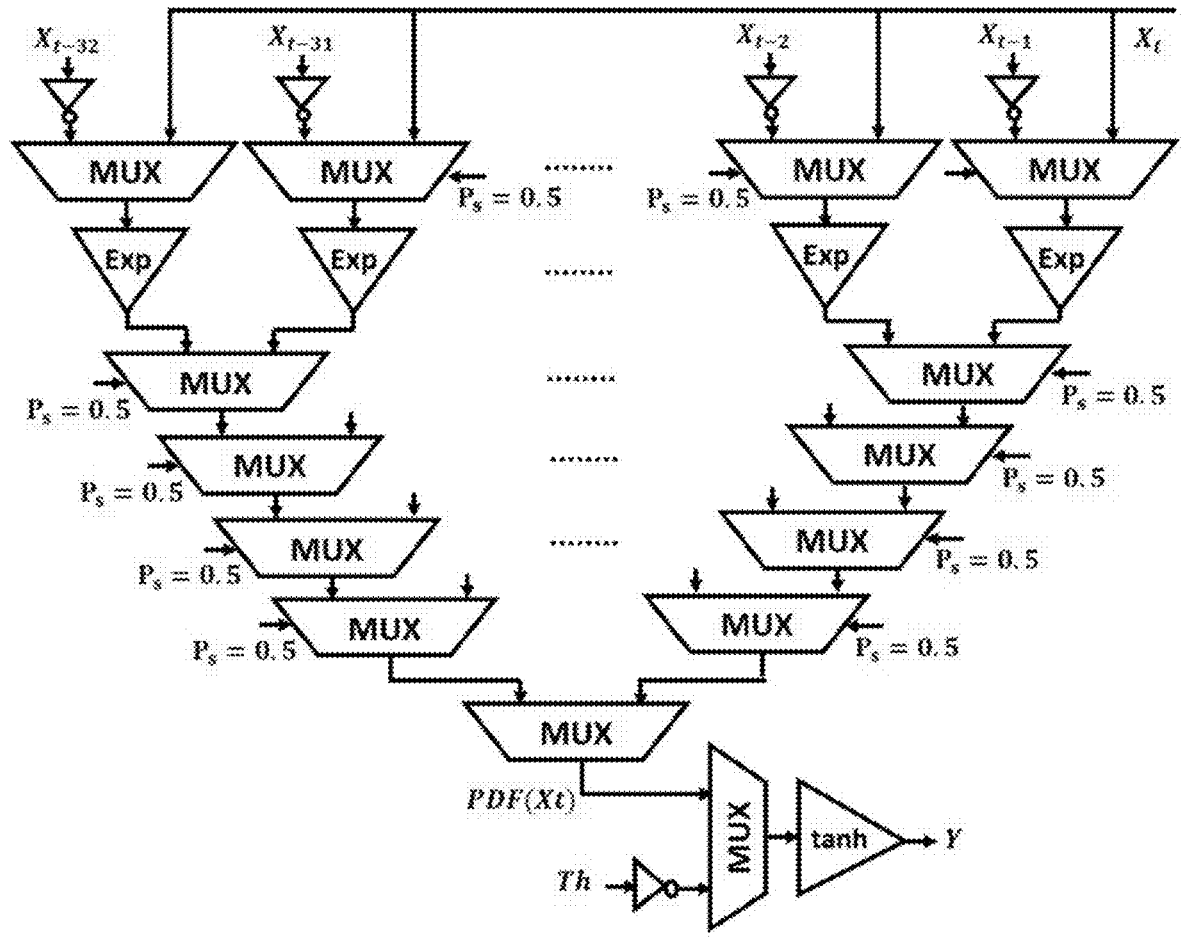
FIG. 15 illustrates a stochastic implementation of the kernel density estimation-based segmentation algorithm.

As another example, Image Segmentation based on Kernel density estimation is an image processing algorithm which is used in object recognition and tracking applications to extract changes in a video stream in real time. Using a probability density function (PDF), the distribution of intensity values a pixel will have at time t can be estimated. A stochastic implementation of this algorithm based on 32 recent frames of the input video is shown in FIG. 15. Let $X_t$; $X_{t-1}$; $X_{t-2}$; . . . ; $X_{t-n}$ be recent samples of intensity values of a pixel X. The stochastic circuit proposed in uses the following formula as the probability estimator:

$$PDF(X_t) = \frac{1}{n} \sum_{i=1}^{n} e^{-4|X_t - X_{t-i}|}$$

Using this probability estimator, a pixel is considered a background pixel if $PDF(X_t)$ is less than a predefined threshold value. In total, the circuit includes 64 MUXs, 32 FSM-based stochastic exponentiation circuits, and one FSM-based stochastic tan h circuit.

Gamma correction is a nonlinear function used to code and decode luminance and tri-stimulus values in video and image processing systems. The required function in the gamma correction processes is $f(x)=x^\gamma$, where x is the value of a pixel in a given gray-scale image and $\gamma$ is the gamma factor. For example, $\gamma=0.45$ is the gamma value used in most TV cameras. A stochastic architecture for computing functions such as gamma correction was proposed in Weikang Qian, Xin Li, M. D. Riedel, K. Bazargan, and D. J. Lilja, An architecture for fault-tolerant computation with stochastic logic, Computers, IEEE Transactions on, 60(1):93-105, January 2011, the contents of which are incorporated herein by reference.

An example of stochastic gamma correction is shown FIG. 6B. The inputs to this system consist of six independent bit streams, each with probability corresponding to the value x of the input pixel, as well as seven random bit streams set to constant values, corresponding to the Bernstein coefficients, $b_0=0.0955$, $b_1=0.7207$, $b_2=0.3476$, $b_3=0.9988$, $b_4=0.7017$, $b_5=0.9695$ and $b_6=0.9939$.

An efficient technique for noise reduction in gray-scale images is to use a median filter. It replaces each pixel with the median value of its neighboring pixels. The operation considers a local window around each pixel, computes the median value of the pixels inside that window, and replaces the pixel with the computed value. A stochastic implementation of a 3×3 median filter was proposed in Peng Li, D. J. Lilja, Weikang Qian, K. Bazargan, and M. D. Riedel, Computation on stochastic bit streams digital image processing case studies, Very Large Scale Integration (VLSI) Systems, IEEE Transactions on, 22(3):449-462, March 2014, the contents of which are incorporated herein by reference.

A premise for stochastic computing is the availability of stochastic bit streams with the requisite probabilities. Such streams can either be generated from physical random sources or with pseudo-random constructs such as linear feedback shift registers (LFSRs). Given an input value in binary radix, the procedure for generating a stochastic bit stream with probability x uses the following procedure. First, obtain an unbiased random value r from the random or pseudorandom source; then compare it to the target value x; finally, output a one if r≤x and a zero otherwise.

The techniques described herein leverage stochastic computation that can tolerate input values that are misaligned temporally. That is, circuits are described that may relax global CDNs timing and skew requirements and/or utilize local clocks to replace a global clock. In general, the techniques described herein are referred to as polysynchronous clocking. This disclosure discusses the functionality of basic stochastic computational elements, such as the multiplier (an AND gate) and the scaled adder (a MUX unit) when these receive inputs driven by different clock sources. This disclosure further presents and evaluates examples of image processing circuits, driven by polysynchronous clocks.

Figure 16:
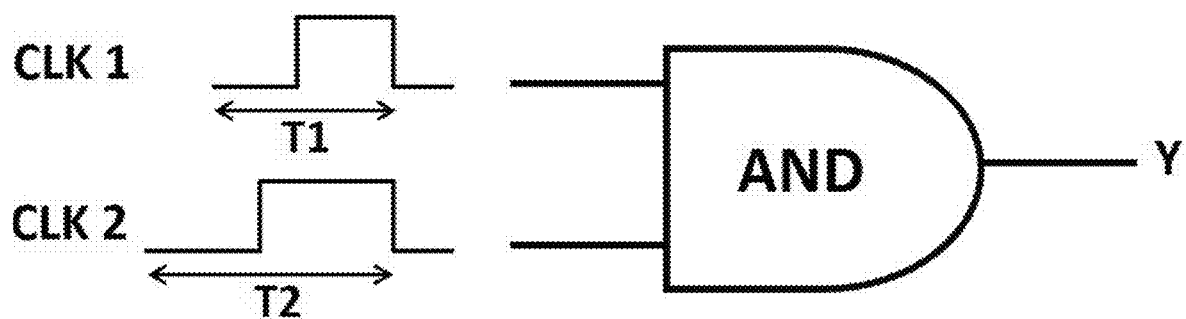
FIG. 16 illustrates an AND gate connected to polysynchronous clock sources.

Basic stochastic operations with polysynchronous inputs may include an AND gate, responsible for multiplying two unipolar input bit streams, P1 and P2, generated by stochastic number generators driven by two clocks with different periods, T1 and T2. In a polysynchronous system, an AND gate may work when two unsynchronized clocks are connected directly to its inputs (see FIG. 16). Connecting two clocks with 50% duty cycles directly to the inputs of an AND gate is equivalent to connecting two stochastic streams both representing P=0.5. Therefore, the expected output value is Y=0.25.

Figure 7:
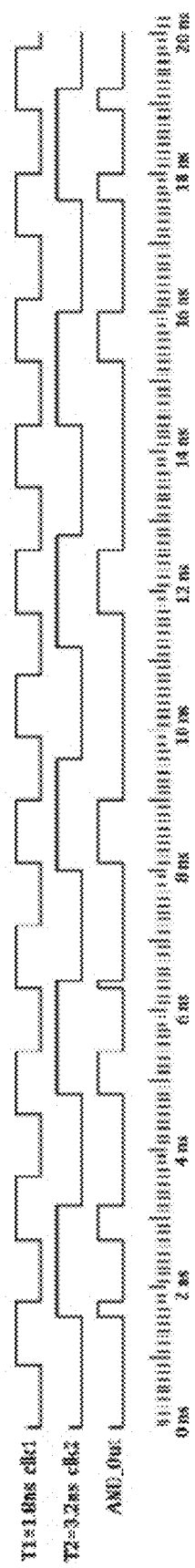
FIG. 7 illustrates two input clock signals and the corresponding output from connecting polysynchronous inputs to an AND gate.

FIG. 7 and Table I address the functionality of performing multiplication using an AND gate according to three different scenarios: 1) T1=2 ns, T2=3.5 ns, 2) T1=2 ns, T2=3.2 ns, and 3) T1=1.8 ns, T2=3.2 ns. FIG. 7 illustrates the input signals as well as the output signal in the case where T1=1.8 ns and T2=3.2 ns for 20 ns of operation. Continuing the operation for about 1000 ns provides a good view of the different lengths of high pulses that are observed at the output of the AND gate. Dividing the total fraction of the time that the output signal is high by the total time gives the result of the multiplication operation. Table I presents results for the three selected cases of clock periods. Table I lists the number of occurrences of high pulses of each length that is observed, as well as the total time of the high pulses.

TABLE I

DIFFERENT OBSERVED LENGTHS OF HIGH PULSES AT THE OUTPUT OF THE AND GATE AND THE NUMBER OF OCCURRENCES OF EACH ONE FOR THREE PAIRS OF CLOCK PERIODS WHEN EXECUTING THE MULTIPLICATION OPERATION FOR 1000 NS.

| T1 = 2 ns T2 = 3.5 ns | | T1 = 2 ns T2 = 3.2 ns | | T1 = 1.8 ns T2 = 3.2 ns | |
|---|---|---|---|---|---|
| Length | # | Length | # | Length | # |
| 0.25 | 72 | 0.2 | 63 | 0.1 | 35 |
| 0.50 | 72 | 0.4 | 63 | 0.2 | 35 |
| 0.75 | 71 | 0.6 | 62 | 0.3 | 35 |
| 1.00 | 142 | 0.8 | 62 | 0.4 | 35 |
| — | — | 1.0 | 125 | 0.5 | 35 |
| — | — | — | — | 0.6 | 35 |
| — | — | — | — | 0.7 | 35 |
| — | — | — | — | 0.8 | 34 |
| — | — | — | — | 0.9 | 138 |
| Total High | 249.25 | | 249.60 | | 249.40 |

TABLE II

THE MEASURED OUTPUT OF THE MUX WHEN THREE POLYSYNCHRONOUS CLOCKS WITH DISTINCT PERIODS ARE CONNECTED TO ITS INPUTS FOR 1000 NS.

| T1 | T2 | T3 | Total High Time | Measured Output | Expected Output |
|---|---|---|---|---|---|
| 2.00 | 1.80 | 3.75 | 499.43 | 0.499 | 0.500 |
| 1.90 | 2.63 | 2.12 | 500.21 | 0.500 | 0.500 |
| 3.20 | 1.60 | 2.00 | 498.80 | 0.499 | 0.500 |
| 2.87 | 2.43 | 2.10 | 499.23 | 0.499 | 0.500 |

Table I shows that when the periods of the two clock sources are varied, the total time that the output is high does not change much. The length of the observed high pulses and the number of occurrences of each high pulse changes, but the total fraction of the time that the output is high is very close to 250 ns. Dividing 250 ns by 1000 ns produces 0.25, the expected output of multiplying the two input streams. This example provides an intuitive explanation of why polysynchronous stochastic operations work: temporal misalignment of input values does not affect the accuracy of the computation.

As shown in Table I, two input clocks were used that have different time periods, and therefore different periods/frequencies. In the first example, the second clock had a period (T2) that is 1.5 nanoseconds greater than the period (T1) of the first clock. This equates to a deviation of 75% from the first clock. In the second example, the deviation in time periods is 1.2 nanoseconds or a deviation in 60% from the first clock. In the third example, the second clock has a period of 3.2 ns, which is an increase of 1.4 ns from the 1.8 ns period of the first clock, which represents an increase of 78%. Polysynchronous stochastic circuits, as described herein, may be tolerant of 10%, 50%, 90%, or up to 100% clock deviation in respective time periods.

Table II addresses the functionality of a MUX unit performing scaled addition with temporally misaligned inputs. The main difference between the MUX unit and the AND gate performing multiplication is that the MUX unit has an extra select stream performing the scaling. To study the functionality of the MUX unit, three polysynchronous clocks with distinct periods, T1, T2, and T3, are connected to the inputs. Table II shows the results of a comparison of the fraction of time that the output is high divided by the total time to the expected value, ($\frac{1}{2}$+$\frac{1}{2}$)/2. These results are similar to the multiplication operation. The measured output values are essentially equal to the expected output value of 0.5. In the four simulations shown in Table II, the first simulation had a maximum clock period deviation from T2 to T3 of 1.95 ns or an increase of 108%, the second simulation had a maximum clock period deviation between T1 and T2 of 0.73 ns or 38%, the third simulation had a maximum clock period deviation between T2 and T1 of 1.6 ns or 100%, and the fourth simulation had a maximum clock period deviation between T3 and T1 of 0.77 ns or 37%.

Table III addresses the general case of operations on stochastic streams generated by stochastic number generators (SNGs) that are driven by separate clocks, and so are not synchronized. Table III presents the results of trials for stochastic multiplication and scaled addition. In this table, T1 and T2 are the periods of the clocks of the SNGs responsible for generating the first and the second streams, respectively. For the scaled addition operations, T3 is the period of the clock of the SNG responsible for generating the select stream, which is set to 0.5. The results presented in Table III are based on bit streams of length 1,024, generated with 32-bit LFSRs. This configuration produces a good Bernoulli distribution of probabilities for the individual bits in the stream. Table III shows that all of the measured values are very close to the expected values. In spite of the polysynchronous clocking, the results are accurate to within the error bound expected for stochastic computation.

TABLE III

STOCHASTIC MULTIPLICATION AND SCALED ADDITON, USING AN AND GATE AND A MUX, RESPECTIVELY, WITH INPUTS GENERATED BY UNSYNCHRONIZED SNGs.

| | | | | | AND Output | | MUX Output | |
|---|---|---|---|---|---|---|---|---|
| In1 | T1(ns) | In2 | T2(ns) | T3(ns) | Meas. | Expec. | Meas. | Expec. |
| 0.50 | 2.10 | 0.50 | 2.30 | 2.00 | 0.247 | 0.250 | 0.502 | 0.500 |
| 0.35 | 2.82 | 0.66 | 3.11 | 3.68 | 0.237 | 0.231 | 0.498 | 0.505 |
| 0.27 | 2.81 | 0.48 | 2.36 | 3.61 | 0.128 | 0.129 | 0.372 | 0.375 |
| 0.18 | 1.60 | 0.53 | 3.70 | 2.20 | 0.096 | 0.095 | 0.350 | 0.355 |

In the four simulations shown in Table II, the first simulation had a maximum clock period deviation from T3 to T2 of 0.30 ns or an increase of 15%, the second simulation had a maximum clock period deviation between T1 and T3 of 0.86 ns or 30%, the third simulation had a maximum clock period deviation between T2 and T3 of 1.25 ns or 53%, and the fourth simulation had a maximum clock period deviation between T1 and T2 of 2.1 ns or a 131% increase of the period T1.

Figure 8:
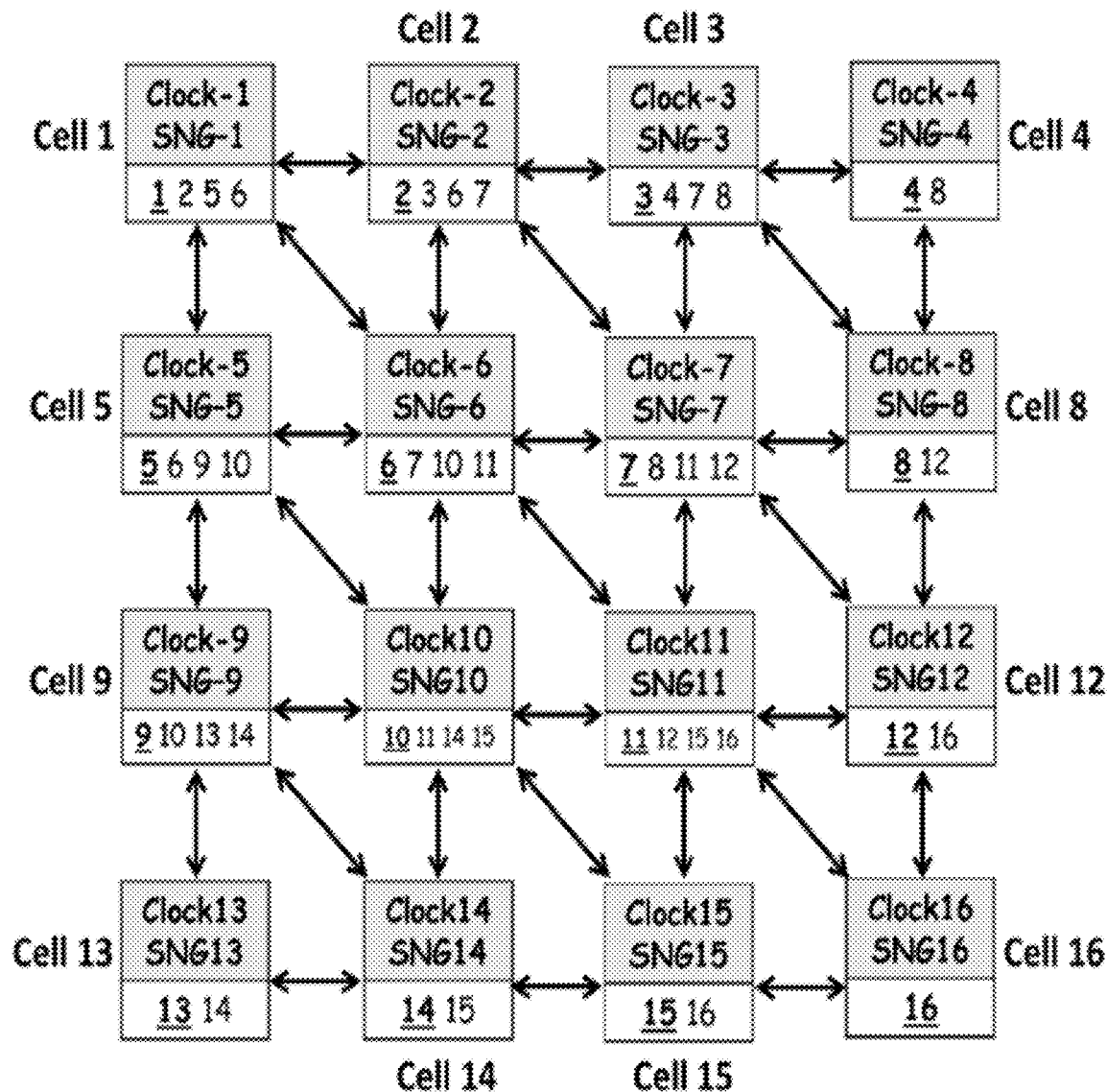
FIG. 8 illustrates sixteen Robert's Cross Cells processing a 4×4 input image concurrently.
Figure 9:
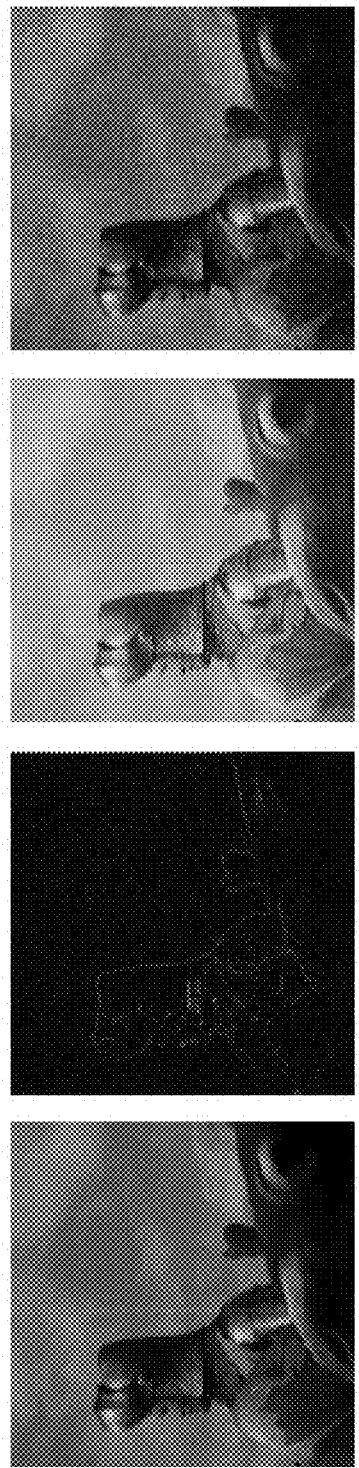
FIG. 9A illustrates the original 256×256 sample image that is used for processing with a polysynchronous stochastic circuit.
FIG. 9B illustrates the outputs of processing the input image using stochastic Robert's Cross edge detection.
FIG. 9C illustrates the outputs of processing the input image using stochastic Gamma Correction.
FIG. 9D illustrates the outputs of processing the input image using stochastic Noise Reduction Median Filtering with synchronized local clocks.
Figure 17:
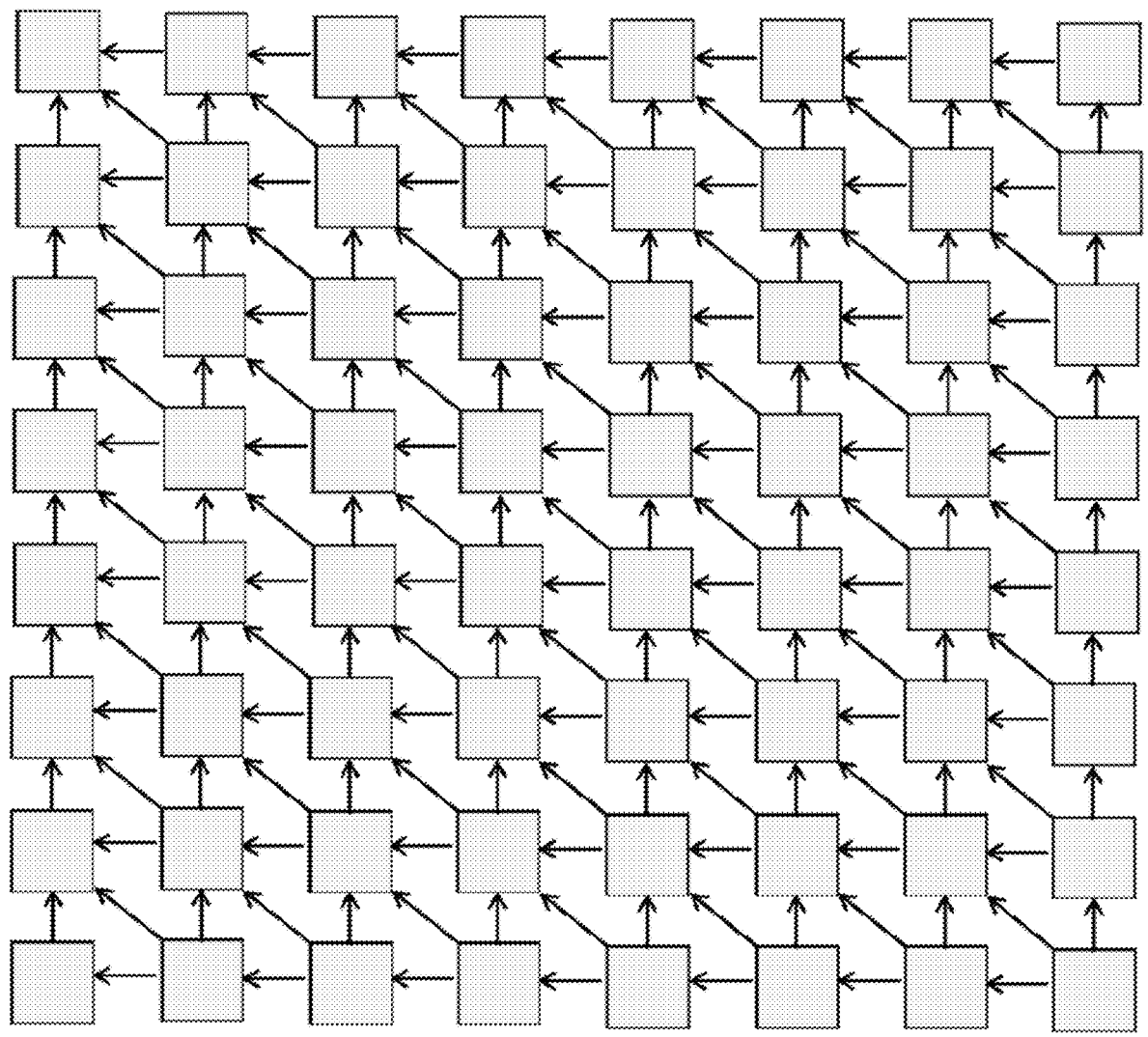
FIG. 17 illustrates 64 Robert's cross cells processing an 8×8 input image concurrently.

Polysynchronous clocking may be used in more complex stochastic circuits, such as the stochastic image processing circuits discussed above for image processing including edge detection, filter and other image data manipulation operations. As one example, an input 4×4 gray-scale image can be processed by a stochastic Robert's Cross edge detection circuit. An efficient way of processing the image is to use 16 instances of the Robert's Cross stochastic circuit to process each of the pixels concurrently. FIG. 8 shows a diagram of a parallel circuit. Each cell may be called a Robert's Cross cell with its own local clock. In this example, each cell is a computational unit (also referred to as a stochastic processing unit or a pixel processing unit herein) that implements the polysynchronous stochastic circuit techniques described herein. The cells may be arranged within an integrated circuit (e.g., a sensor or image processing device) as an array of pixel processing units, as shown in FIGS. 8 and 17. Each cell converts its input pixel value, presented as a stochastic bit stream, into an output pixel value, presented as stochastic bit stream. Each stochastic bit stream may include one or more input pixel values corresponding to a pixel in an image. The input bit stream is generated by an SNG driven by the cell's local clock. The cell communicates with its neighbor cells to receive their pixel values, presented as stochastic bit streams. These bit streams arriving from neighboring cells are generated by SNGs driven by their local clocks, so the input bit streams will not all be synchronized. The clocks may potentially all have different frequencies and phases.

Each local clock may independently generate an input clock signal for one or more cells. In some examples, each cell may include a single local clock generator, such that each cell processes pixel data based on its own local clock. In other words, in this example, the cell array conforms to the "Poly Local" technique described herein such that the device does not utilize any form of a centralized clock distribution network to distribute clocks to the cells but instead each cell has its own local clock generator to independently generate a local clock without synchronization with other local clocks. This arrangement may reduce the delivery time of clock signals to the local cell(s) and reduce the circuitry for delivering clock signals. In some examples, the number of local clocks may approximate the number of cells.

Consider the first cell in FIG. 8. This cell is responsible for processing the image pixel 1 to decide whether it is on an edge or not. This cell takes a pixel intensity value and converts it to a stochastic bit stream using an SNG driven by a local clock. This action involves receiving streams corresponding to the values of neighboring pixels 2, 5, and 6. The pulses that the first cell receives from cells 2, 5, and 6 are all generated by SNGs driven by local clocks. Accordingly, the input bit streams are all potentially misaligned temporally. Nevertheless, as described below, the computation is accurate.

Experimental Results:

The three stochastic image processing circuits were implemented for Robert's Cross edge detection, Gamma correction, and noise reduction, in Verilog. For the Robert's Cross circuit, three out of four streams are received asynchronously with respect to the local clock of each cell. Similarly, for the noise reduction circuit, eight out of nine streams are received asynchronously with respect to the local clock of each cell. For the Gamma correction circuit, the bit streams are generated for the Bernstein coefficients streams with SNGs driven by local clocks. The bit streams are generated for the independent copies of the input value x using SNGs driven by local clocks.

The following simulations use a 256×256 sample input image with 65,536 pixels. The simulations were performed using the ModelSim hardware simulator. The SNG unit converted input pixel values into stochastic bit streams, using a 32-bit maximal period LFSR. This pseudorandom number generator was seeded with a random initial value for each trial; 10 trials were performed to ensure statistically significant results. Bit streams of length 1,024 were used to represent the values. To convert the output bit streams into deterministic real values, the fraction of the time the output signal is high was measured and divided by the total time of the computation. For example, if the output signal was high 25% of the time, it is evaluated as 0.25.

To evaluate the correct functionality of polysynchronous circuits, a "golden case" was used. In the golden case, the sample image was processed using stochastic circuits with all local clocks synchronized. FIGS. 9a-9d show the sample image and the resulting output images. The synchronized clocks had a period of 2 ns.

Six different clocking schemes were compared when evaluating the three stochastic image processing circuits:

Scheme 1. The period of the local clock in all processing cells is fixed at 2 ns (the "golden case" above).

Scheme 2. The period of the local clock in each cell is a random real value between 2-3 ns (so 50% variation between the clock periods).

Scheme 3. The period of the local clock in each cell is a random real value between 2-4 ns (so 100% variation).

Scheme 4. The periods of the local clocks are random values between 2-4 ns, but high output pulses that are less than 10% of the 2 ns clock period (0.2 ns) are filtered out (i.e., they are set to 0).

Scheme 5. Same as Scheme 4, but with filtering of high output pulses that are less than 15% of the 2 ns clock period.

Scheme 6. Same as Scheme 4, but with filtering of high output pulses that are less than 20% of the 2 ns clock period.

The motivation for schemes 2 and 3 is to study the impact of having more variation between the local clocks. For schemes 4, 5 and 6, it is to approximate hardware conditions in which short pulses, which may be called runt pulses, do not reach a valid high or low level and cannot change the output states of the gates.

TABLE IV

THE MEAN OF THE OUTPUT ERROR RATES FOR THE THREE IMPLEMETED STOCHASTIC CIRCUITS, SIMULATED IN SIX DIFFERENT CLOCKING SCHEMES.

| Circuit | Clocking Schemes | | | | | |
|---|---|---|---|---|---|---|
| | S.1 | S.2 | S.3 | S.4 | S.5 | S.6 |
| Robert. | 2.88% | 2.89% | 2.94% | 2.89% | 2.92% | 2.88% |
| Gamma. | 2.56% | 2.50% | 2.49% | 2.51% | 2.59% | 2.64% |
| Median. | 3.15% | 3.19% | 3.31% | 3.28% | 3.39% | 3.31% |

Starting with the stochastic Robert's Cross circuit, Table IV shows the processing of the sample image using the six schemes described above. Each one of the three stochastic circuits based on these six schemes was simulated 10 times, each time with different initial conditions: 10 different LFSR seed values for each SNG and 10 different sets of values for the periods of the local clocks. The results are the average results of these trials. For each output image, the average output error rate is calculated as follows:

$$E = \frac{\sum_{i=1}^{256} \sum_{j=1}^{256} |T_{i,j} - S_{i,j}|}{255 \cdot (256 \times 256)} \times 100$$

where $S_{i,j}$ is the expected pixel value in the output image and $T_{i,j}$ is the pixel value produced using the stochastic circuit.

Table IV shows the mean of the error rates of the results produced by processing the sample image with the six schemes described above. By comparing the measured accuracies of the first scheme, i.e., the golden case, to the five polysynchronous schemes, it becomes apparent that the quality of the results and the accuracy of the computations are essentially independent of how well synchronized the local clocks are. In fact, as Table IV shows, the clock periods can vary by up to 100% without affecting the accuracy of the results.

As can be seen in Table IV, in some examples, the mean of the error in the polysynchronous circuits is actually slightly below that of the synchronous case. This improvement can occur because polysynchronous clocks can produce more random-looking input streams. Thus, polysynchrony might actually help instead of hurting stochastic computation. The results from schemes 4-6 show that filtering out runt pulses still produces statistically acceptable results.

For a circuit-level verification of the proposed idea, the SPICE netlist of the Robert's Cross stochastic circuit was implemented. Simulations were carried out using a 45 nm gate library in HSPICE on 500 sets of random input values, for both synchronous and polysynchronous clocking conditions. Each set of inputs consisted of four different random values.

For the conventional synchronous clocking condition, the circuit's clock period was fixed at 1 ns. For the polysynchronous clocking conditions, clock periods were selected randomly in the range from 1 ns to 2 ns, which is equivalent to 100% variation. The period corresponds to a single bit in the random stream.

The accuracy of the results was computed by calculating the difference between the expected value and the measured value. On 500 trials, the mean of the output error rates was 4.91% for the synchronous and 4.42% for the polysynchronous approach. Hence, polysynchronous stochastic circuits are essentially as accurate as conventional synchronous circuits.

As shown above, Table IV provides experimental results based on Verilog HDL simulation to show the correct functionality of the Robert's cross circuit and two other stochastic circuits in cases with up to 100% clock misalignment. As another example, in Table IV, Scheme 3 shows the mean of the output error rates where neighbor cells have local clocks with up to 100% difference between their periods. This disclosure has presented a circuit-level verification of the techniques described herein with SPICE level simulation. These simulation results alongside the performance results, such as those presented in FIGS. 20, 21A, and 21B, demonstrate various examples of the ability of stochastic circuits described herein in tolerating clock misalignment.

This disclosure has presented a novel paradigm for sequential computation that is synchronous, but only loosely so. This concept is predicated on the paradigm of stochastic computing. Many of the functions for computational systems such as signal processing can be implemented using the techniques described herein as arithmetic functions, consisting of operations like addition and multiplication. Complex functions such as exponentials and trigonometric functions are generally computed through polynomial approximations, so consist of multiplications and additions. Such functions can be implemented with remarkably simple logic in the stochastic paradigm using the techniques described herein. Simple hardware generally translates to low power consumption. Certainly, it translates to low leakage power consumption, a metric of eminent concern to modern integrated circuit designers.

Another important benefit of the stochastic paradigm is the flexibility that it provides with respect to the clocking mechanism. Indeed, stochastic logic computes accurately irrespective of the temporal alignment of input values, so it can tolerate arbitrary amounts of clock skew. As a result, a global clock and its associated clock distribution network can be replaced with locally generated clocks. These can be simple, yet fast, inverter rings, for instance.

Accuracy of the computation is not impacted if a global clock is replaced with unsynchronized local clocks. There may be additional benefits obtained by eliminating the CDN in integrated circuits. The area, power and design complexity will all be impacted in positive sense if the CDN can be eliminated.

Indeed, the question of how unsynchronized values can interface with non-stochastic logic is an important one. In some examples, circuits will process stochastic values from input to output. There may be efficient mechanisms for analog-to-digital (A/D) conversion at the circuit inputs, with devices that generate stochastic bit streams directly from analog sources. These devices—essentially modified sigma-delta converters—are highly efficient. These devices provide random bit streams at no extra cost; in fact, they are significantly less costly in terms of area and power than full sigma-delta converters. Similarly, highly efficient digital-to-analog (D/A) converters for the circuit outputs may be possible. These converters produce accurate analog signals directly based on the fraction of time that digital signals are high, irrespective of pulse widths. The polysynchronous stochastic approach described herein provides exactly this form of output: the values correspond to the fraction of time that signals are high, without any concern for pulse widths.

The polysynchronous stochastic approach is a good fit for applications that require only modest accuracy but call for low cost, low power and high resiliency.

With polysynchronous clocking described herein, the global clock signal of a circuit and its associated CDN can be relaxed or even replaced by multiple inexpensive clocks for different local domains. Moreover, the division into clock domains can be performed down to a very fine level, even up to a handful of gates. The local clocks can be generated with simple inverter rings.

In one example implementation of the polysynchronous stochastic design paradigm described herein, a computing system can be divided into three main units: 1) stochastic number generators (SNGs) that convert input values, perhaps from analog sources, into the corresponding stochastic signals; 2) computational units that accept stochastic input signals and perform operations, producing stochastic output signals; and 3) stochastic output converters that produce output signals, perhaps for analog outputs such as voltage accumulators. The output converters measure the fraction of time the output signals are high divided by the total operation time to produce the final values.

Consider an input n×n gray-scale image to process with a Robert's cross circuit. There are $n^2$ instances of the Robert's cross circuit, presented in FIG. 12, to process each of the pixels concurrently. FIG. 17 shows a diagram of such a parallel circuit for n=8. Each instance of a Robert's cross may be called a cell. Each cell converts one input pixel value, represented as a stochastic signal, into an output pixel value, represented as stochastic signal. An SNG in each cell is responsible for the input conversion. The cell communicates with its neighbor cells to receive their pixel values, all represented as stochastic signals.

Consider three different examples to describe and validate the polysynchronous clocking techniques described herein. First, a case study is described that uses a conventional synchronous approach: a global CDN that synchronizes all cells of the Robert's cross circuit. Next, the global CDN for the Robert's cross circuit is removed and replaced with locally generated clocks for each cell; now the cells do not operate synchronously. Finally, a circuit is described in which a "relaxed CDN" is used. In each case, the costs are quantified for the Robert's cross circuits with 16, 64, and 256 cells.

In the conventional approach, a global CDN is synthesized to synchronize all components of the system with a common clock signal. The arrival time of the clock signal needs to be synchronized throughout. With variations, this requirement for zero clock skew is challenging, requiring considerable design effort. The larger the circuit, the more complex the CDN. Often, a large number of buffers must be inserted throughout the CDN to balance the clock tree and satisfy the arrival time requirements. In addition to the high amount of design effort expended, the CDN consumes considerable area and power.

In the first polysynchronous approach according to the techniques herein, the global CDN is removed and replaced with unsynchronized local clocks. Two different approaches can be used to supply local domains with clock signals: 1) Using clock signals from external sources, and 2) self-timed local clock generators. Because of the limitation and extra costs of I/O ports, the first approach is more practical when there are a small number of clock domains. With a large number of domains, self-timed local clock generators are generally advantageous. The second approach was evaluated and this disclosure presents a quantitative comparison of the performance/cost gain when the global CDN is replaced with multiple local clock generators.

Figure 18:
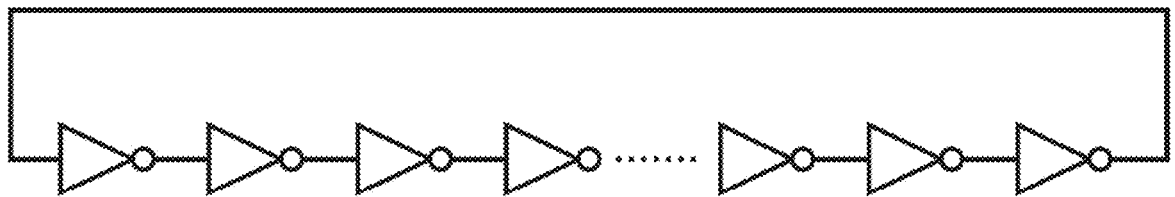
FIG. 18 illustrates a ring oscillator circuit with odd number of stages.

Ring oscillators can be used as fast and inexpensive local clock generators. A ring oscillator consists of an odd number of inverter gates connected in a ring, as shown in FIG. 18. The oscillation period of such a ring is twice the sum of the gate delays. The frequency can be increased by either increasing the supply voltage or by decreasing the number of inverters. Note that a ring of approximately 120 inverter gates is necessary to generate a local clock with a period of 1 ns in 45 nm technology when the supply voltage is one volt. Thus, although relatively inexpensive, still the area and power costs of inverter rings (see FIG. 18) are not insignificant.

Instead of eliminating the CDN, an alternative approach is to relax the requirements on it, permitting significant clock skew throughout the system. This can significantly simplify the synthesis process, saving area, lowering power, and increasing performance by permitting the system to be clocked at a higher speed. This approach does not entail the use of local clock generators.

One significant advantage that such a "relaxed CDN" provides is ease in controlling the working frequency. With local clocks, e.g., generated by inverter rings, the frequency will generally be fixed (some implementations of ring oscillators do allow for slight adjustments to the period; however, the possible range of values is more or less fixed by the number of inverters used). In contrast, the frequency of an external clock provided to a "relaxed CDN" can be changed freely, in some cases permitting significant over-clocking.

In order to quantify the performance and cost benefits of both approaches to polysynchronous design by removing the CDN or relaxing it, the Robert's cross circuit was implemented for values of n=4, 8, and 16 in Verilog. The SNG unit presented in FIG. 10 was used in each cell to convert the input pixel value into a corresponding stochastic signal. A 10-bit maximal period LFSR was used in each cell to supply the SNG with pseudo-random numbers. FSM-based SAbs circuits with 16 states were used to implement the required absolute value function. The Synopsys Design Compiler vH2013.12 was used with a 45 nm gate library to synthesize the designs. Synopsys Design Compiler as the synthesis tool determined the clock period or the maximum working frequency of the circuits. For different circuits, different clock periods were used based on the synthesis results.

For synthesizing the circuits with conventional global CDNs, the experiment included a "clock uncertainty" value of 1 percent for the smaller 16-cell circuit, and of 2 percent for the larger 64 and 256-cell circuits. This uncertainty parameter in the Synopsys Design Compiler represents process variations and other sources of variability that cause variation in the clock delay. In the synthesis flow, the tool uses extra elements, mainly delay buffers, to ensure near zero clock skew in the signal arrival time at all components. It produces a circuit with cells that are nearly perfectly synchronized.

To simulate the "relaxed CDN" approach described herein, the experiment allowed for significant skew and jitter by defining a clock source uncertainty of zero and accepting some timing violations. As a result, the tool ignores the delays due to the clock network latency and the propagation delay in different paths. It does not add any buffers to compensate for clock uncertainty. With this approach, different cells are at differing distances from the clock input source. As a result, the clock signals arriving at different cells are not synchronized. The experiment included this configuration to test the polysynchronous approach's ability to tolerate the clock skew and jitter.

For the approach where that eliminates the global CDN entirely by replacing it with local unsynchronized clocks (referred to herein as "Poly Local"), the system was synthesized with 16, 64, and 256 cells, with each cell containing an inverter ring. In order to design the inverter rings, the experiment first synthesized a single Robert's cross cell and found its critical path to be 0.49 ns. SPICE-level simulations showed that 45 inverter gates are required to generate a clock signal with this period in the 45 nm technology when using a supply voltage of 1V. Such inverter rings were added to each Robert's cross cell. Table V shows the area-power cost of a single Robert's cross cell before and after adding the inverter rings. Adding the inverter ring incurs area and power overhead of 8 percent and 24 percent, respectively. For large designs, this overhead is small compared to the savings obtained by removing the CDN.

TABLE V

Synthesis results for a single Robert's cross cell with
and without a local clock generator.

| One Robert's cross cell | Area ($\mu m^2$) | Power at 2 Ghz (mW) |
|---|---|---|
| Without local clock generator | 268.0 | 0.83 |
| With local clock generator | 291.9 | 1.09 |

For the Poly Local approach, as shown in Table VI, all Robert's cross cells are working with a fixed period of 0.49 ns, which is the critical path of a single Robert's cross cell in this simulation. In the Robert's cross circuit implementation, each cell (pixel processing unit) communicates with three neighbor cells to receive their generated data signals for the respective pixels. A respective ring oscillator proximate each cell was responsible for generating the local clock in each cell, and each ring oscillator operated independently from the other oscillators. As such, clock misalignment between the independent local clocks could be arbitrary and may deviate up to a full period. In real chip fabrication, there may be difference in the period of the locally generated clocks due to variations between the period of the locally generated clocks of two neighbor cells. As shown, the circuits described herein tolerate the clock misalignment and produce a bit error rate equal to or less than circuits utilizing an expensive, fully-synchronized CDN.

The synthesis results, including the delay, area, total dynamic and static power consumption, energy dissipation of one clock cycle, and area-delay product, are shown in Table VI. The reduction in delay, seen as equivalent to increasing the working frequency, is the most significant benefit of polysynchronous clocking. The results show that increasing the number of cells limits the performance of the system when a global CDN with zero clock uncertainty is implemented. Providing all the cells with synchronized clock signals via a CDN is costly. For the system with 256 cells, removing the CDN entirely and instead using respective, locally-generated clocks for each pixel processing cell (referred to as Poly Local) improves the maximum working frequency by around 12×. As a result, the output converges to an accurate value much faster. With a relaxed CDN (referred to as Poly Relaxed), the benefit is also significant, although not as great as with locally generated clocks. The savings gained by these approaches are presented in FIG. 19.

Figure 19:
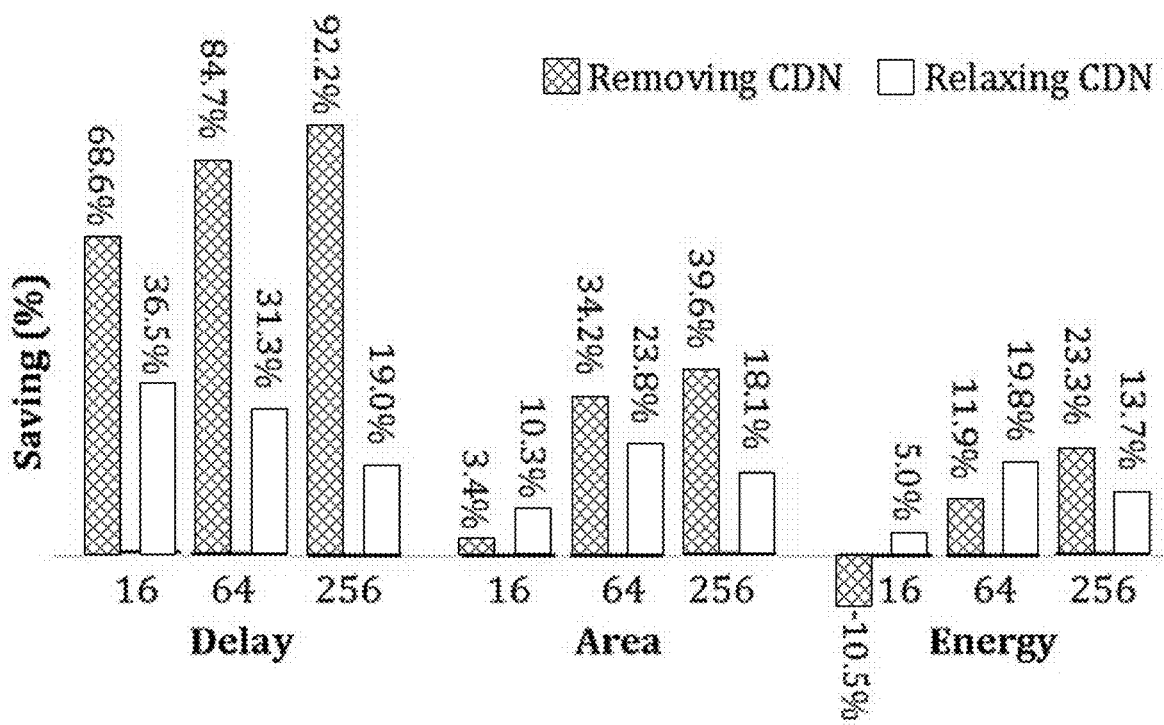
FIG. 19 illustrates a comparison of the savings due to using different approaches of polysynchronous clocking on various sizes of the Robert's cross circuit.

In terms of area, both techniques tested (Poly Local and Poly Relaxed) decrease the cost in the three cases with 16, 64, and 256 cells, as shown in FIG. 19, as compared to utilizing a synchronous CDN. As expected, for large-scale systems (64 and 256 cells), removing the CDN provides more area saving than simply relaxing the CDN. It provides up to a 39 percent area reduction in the system with 256-cells. However, for smaller systems, the area overhead incurred by the local clock generators diminishes the benefits. Relaxing the CDN instead of completely eliminating the CDN may be a better approach for some small circuits.

As shown in Table VI and FIG. 19, removing the CDN results in an overall energy dissipation reduction, except for the 16-cell circuit. For the 16-cell circuit, removing the CDN improves the latency and area by 68 percent and 3 percent, respectively. However, the power consumption of the circuit with the highest frequency increases around 3.5 times. This increase in power consumption occurs because the local clock's power consumption outgrows the power savings obtained by eliminating the CDN, which is small for this circuit. A higher working frequency also increases the power. Consequently, a 10 percent increase in the energy dissipation is observed. Thus, unless improving the working frequency is the main goal, relaxing the CDN or using a zero-clock-skew CDN might be better choices for smaller circuits. However, for larger circuits, eliminating the global CDN and using locally generated clocks is a winning proposition.

To further evaluate idea of relaxing the CDN in stochastic circuits, the experiment implemented two complex circuits, discussed above: a median filter based noise reduction circuit and a kernel density estimation based image segmentation circuit. These were implemented: 1) using a conventional synchronous approach with zero clock uncertainty tolerance; and (2) in the proposed polysynchronous approach with a relaxed CDN. FSM-based stochastic circuits with 32 states were used to implement the required tan h and exp functions. The experiment used a 0.2 ns clock uncertainty when the circuits were synthesized with Design Compiler. Table VI compares the delay, area, power, and energy results extracted for these circuits. As can be seen, relaxing the CDN improves the performance and saves area for both circuits. The power consumption when using the maximum working frequency is higher with a relaxed CDN due to the increase in the frequency. However, more importantly, the total energy dissipation (power x delay) of the circuits is improved.

TABLE VI

Delay, area, power, and average error rate comparison of the
implemented circuits for different approaches of synthesizing the CDN.

| Circuit | CDN | Delay (ns) | Area ($\mu m^2$) | Power (mW) | Engery(pJ) | Area*Delay ($\mu m^2 \times \mu s$) | Error Rate (percent) |
|---|---|---|---|---|---|---|---|
| Robert 16-cell | Synchronous | 1.56 | 4485 | 5.41 | 8.44 | 7.00 | 2.20 |
| | Poly Local | 0.49 | 4332 | 19.04 | 9.33 | 2.12 | 1.77 |
| | Poly Relaxed | 0.99 | 4025 | 8.1 | 8.02 | 3.98 | 2.12 |
| Robert 64-cell | Synchronous | 3.20 | 25438 | 13.25 | 42.40 | 81.40 | 2.56 |
| | Poly Local | 0.49 | 16750 | 76.26 | 37.37 | 8.21 | 1.67 |
| | Poly Relaxed | 2.20 | 19391 | 15.45 | 33.99 | 42.66 | 2.57 |
| Robert 256-cell | Synchronous | 6.30 | 111319 | 31.06 | 195.68 | 701.31 | 2.68 |
| | Poly Local | 0.49 | 67242 | 306.18 | 150.03 | 32.95 | 1.87 |
| | Poly Relaxed | 5.1 | 91121 | 33.12 | 168.91 | 464.72 | 2.37 |
| Median Filter | Synchronous | 2.91 | 3169 | 1.39 | 4.04 | 9.22 | 2.64 |
| | Poly Relaxed | 2.45 | 2694 | 1.45 | 3.55 | 6.60 | 2.62 |
| KDE | Synchronous | 2.14 | 4921 | 3.08 | 6.60 | 10.53 | 1.70 |
| | Poly Relaxed | 1.75 | 4443 | 3.42 | 5.99 | 7.78 | 1.69 |

Figure 20:
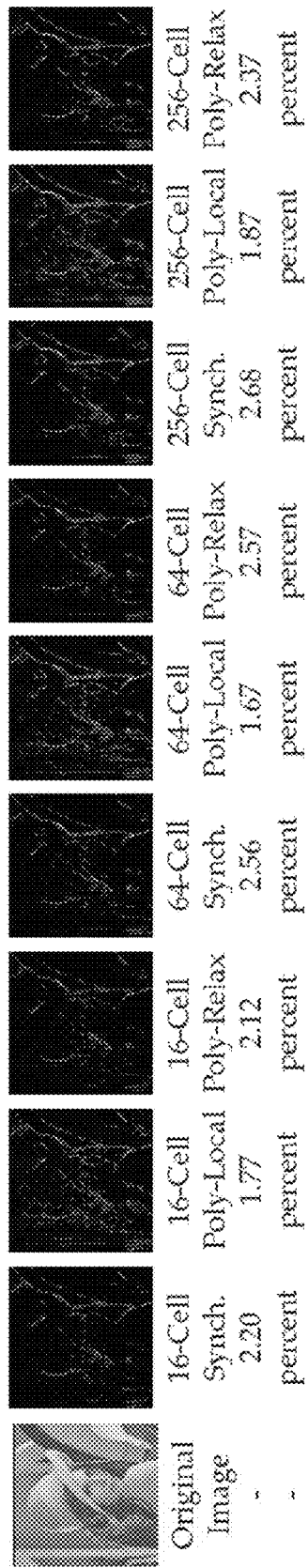
FIG. 20 illustrates an original sample input image and the output images produced by post-synthesis simulations of the synthesized Robert's cross circuit.
Figure 21A:
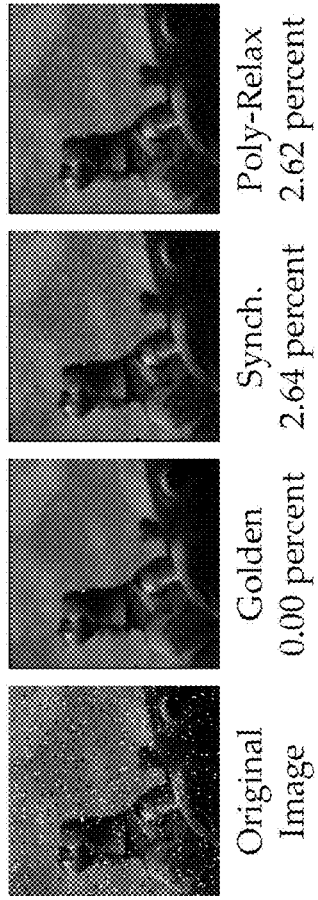
FIGS. 21A and 21B illustrate original sample input images and the output images of processing the sample images by post-synthesis simulations of the synthesized circuits with a relaxed CDN by a median filter noise reduction circuit and a KDE image segmentation circuit.
Figure 21B:
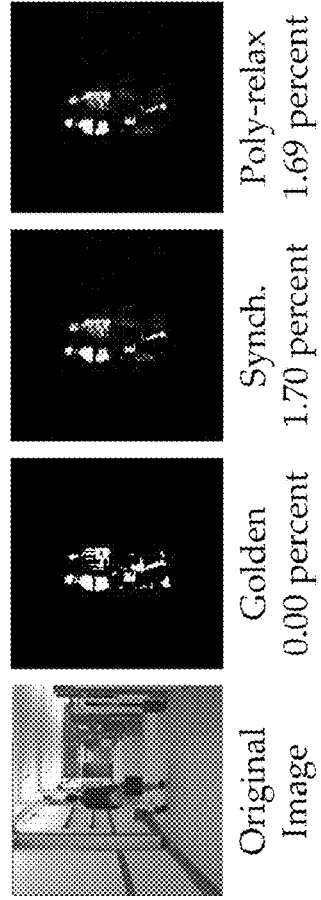

In order to evaluate the performance of the synthesized circuits, the experiment included post-synthesis simulations and processed the 128*128 Lena image using the Robert's cross circuits, a 128*128 noisy image using the median filter circuits, and 32 144*144 subsequent frames of the "Hall Monitor" test video sequence using the KDE image segmentation circuits. For simulations with the Robert's cross circuits, image pixels were divided into groups of 16, 64, and 256 pixels, depending on the number of circuit inputs. Input pixels in each group were converted to stochastic signals and processed by the Robert's cross cells concurrently. To produce the output image, the experiment measured the fraction of the time the circuits' output signals were high for 1024 cycles. The output image produced by each circuit was compared with a "Golden" output image produced by Matlab and an average error rate was calculated as follows:

$$E = \frac{\sum_{i=1}^{128} \sum_{j=1}^{128} |T_{i,j} - S_{i,j}|}{255 \cdot (128 * 128)} \times 100$$

where $S_{i,j}$ is the expected pixel value in the perfect output image and $T_{i,j}$ is the pixel value produced using postsynthesis simulations including timing violations (setup and hold). The output images produced by post-synthesis simulation of the Robert's cross circuits are shown in FIG. 20. The mean of the output error rates measured for each circuit is also shown in Table VI. The outputs from processing the sample images using the median filter noise reduction and the KDE image segmentation circuits in the synchronous and polysynchronous versions of the circuits with a relaxed CDN are shown in FIGS. 21A and 21B. As can be seen in these results, removing and relaxing the CDN not only has not decreased the quality of the results, but also in most cases has actually improved the average error rate of processing image pixels. This improvement in the quality of the results is mainly due to the additional randomness introduced by the polysynchronous clocking.

There are three main sources of computational errors in the conventional synchronous stochastic circuits. The first source of computational errors is function approximation error ($E_A$). This error stems from the fact that the computation is a mathematical approximation of the desired function. For instance, the FSM-based stochastic absolute value function used in the Robert's cross circuit is an approximation of the desired absolute value function. The approximation error for such FSM-based functions depends on the number of states. The more states used to implement the FSM, the smaller approximation error. Further example details of approximation errors for FSM-based circuits can be found in Peng et al., Logical computation on stochastic bit streams with linear finite-state machines, Computers, IEEE Transactions on, 63(6): 1474-1486, June 2014, which is incorporated herein by reference in its respective entirety. Peng et al. reported 0.03 percent function approximation error for a 32-state FSM-based implementation of the stochastic exponentiation function. The function approximation errors in the 16-state implementation of stochastic Abs function and the 32-state version of the stochastic tan h function are very close to zero.

The second source of computational errors is quantization error ($E_Q$). In converting the input values in the interval [0, 1] or [−1, 1] into stochastic bit streams, the SNG rounds the input value to the closest number in the set of discrete probabilities it can generate. Increasing the length of the bit streams will reduce this quantization error.

The third source of computational errors are errors due to random fluctuations ($E_R$). Errors due to random fluctuations are inherent in stochastic computing since the input values are intentionally randomized. The bit streams can be described as a Bernoulli distribution and can be quantified using the variance of the distribution. Thus, these errors are inversely proportional to the square root of the length of the stream.

In addition to these errors, the polysynchronous clocking approach introduces an extra source of error: errors due to temporally misaligned bits in the streams ($E_C$). As the average error rate results presented in Table VI show, temporal misalignment of inputs is an unbiased source of error that can either increase or decrease the mean of the total error in the polysynchronous circuits. Therefore, for polysynchronous clocking, the effect of temporally misaligned inputs on accuracy is, in fact, minimal.

Summing all of these error sources, the total error for a polysynchronous circuit is no worse than:

$$E_{Total} = E_A + E_Q + E_R + E_C$$

Based on the error rate results presented in Table VI and FIGS. 20, 21A, and 21B, removing or relaxing the CDN allows the maximum frequency of the circuit to be increased without affecting the accuracy of the computation compared to a conventional synchronous stochastic implementation of the circuits.

The error tolerance of the polysynchronous stochastic circuit designs of this disclosure can be compared to conventional synchronous designs. To do so, trials were performed on the circuits discussed herein, randomly injecting soft errors, i.e., bit flips, on the internal signal lines and measuring the corresponding average output error rates.

For the synchronous circuits, the inputs were generated with SNGs driven by synchronized clocks each with a period of 2 ns. For the polysynchronous circuits, the inputs were generated by SNGs driven by clocks with periods varying randomly between 2 and 4 ns. Note that this range of values provides a variation of up to 100 percent in the clock periods. To approximate hardware conditions in which short pulses ("spikes") cannot satisfy the setup and hold time requirements of logic gates, high output pulses that were less than 10 percent of the 2 ns clock period (0.2 ns) were filtered out by setting them to zero.

Soft errors were simulated by independently flipping a given fraction of the input and output signals of each computing element. For example, a soft error rate of 20 percent means that 20 percent of the total bits in an input value are randomly chosen and flipped. To inject soft errors into a computational element such as a MUX, the experiment inserted XOR gates into all of its inputs and outputs. For each XOR gate, one of its inputs is connected to the original signal of the MUX and the other is connected to a global random soft error source, implemented using an LFSR and a comparator. Note that the experiment did not simultaneously inject soft errors on the input and output signals of any given component. Also, the experiment did not inject soft errors more than once on the intermediate line between two components (thereby potentially undoing a bit flip).

The experiment applied this approach to all of the basic computational elements of the stochastic circuits. Hardware simulations were performed using the ModelSim hardware simulator. Maximal period 32-bit LFSRs were used for converting input pixel values into stochastic bit streams. Bit streams of length 1024 were used to represent the values. Ten trials were performed for each case to ensure statistically significant results. For each trial, the experiment used a different initial condition with ten different LFSR seed values for each SNG. Simultaneously, ten different sets of values for the periods of the polysynchronous clocks were used. This disclosure presents the average results of these trials.

The sample images shown in FIGS. 20, 21A, and 21B were used as the inputs to the circuits. Table VII shows the average output error rates of the two design approaches under different soft error injection rates. As can be seen, the polysynchronous stochastic circuits are as error tolerant as the synchronous versions. For both polysynchronous and synchronous circuits, the error tolerance scales gracefully to very large numbers of errors.

TABLE VII

The average error rate of the stochastic circuits for different soft error injection rates.

| Circuit | Clocking Approach | Injection Rate | | | |
|---|---|---|---|---|---|
| | | 0 percent | 5 percent | 10 percent | 20 percent |
| Robert's Cross | Sync. | 2.6 | 2.6 | 2.7 | 2.94 |
| | Polysync. | 2.59 | 2.6 | 2.7 | 2.94 |
| Median Filter | Sync. | 3.03 | 3.08 | 3.28 | 4.08 |
| | Polysync. | 3.13 | 3.08 | 3.22 | 4.04 |
| KDE | Sync. | 1.21 | 1.26 | 1.62 | 2.84 |
| | Polysync. | 1.24 | 1.40 | 1.67 | 2.93 |

The paradigm advocated in this disclosure differs from the asynchronous and GALS approaches in that no complex handshaking mechanisms are needed. The skew tolerance provided by stochastic computing allows independent clock domains to be connected together seamlessly without influencing the accuracy. Alternatively, it allows for a much less costly global clock distribution network, with relaxed constraints. This, in turn, provides very significant benefits in terms of area, performance and energy. The increase in performance, in particular, can be quite significant. For applications that require modest accuracy, this increase in performance could more than offset the latency incurred by adopting a stochastic representation.

High energy dissipation is one of the main challenges in the practical use of SC. Stochastic circuits are compact and so consume little power. However, given the high latency, the energy consumption (equal to power_time) is high. Energy reduction techniques for stochastic computing may exploit the tolerance that SC offers to timing errors. This permits very aggressive voltage scaling without significant quality degradation. The impact of timing errors due to voltage scaling is similar to the impact of clock skew errors. In both cases, SC naturally and effectively provides error tolerance. Future work will consider the impact of both energy and clock distribution optimizations for SC.

This disclosure proposed polysynchronous clocking, a design strategy for exploiting the skew tolerance of SC circuits. From basic stochastic operations, such as multiplication and scaled addition, to complex stochastic circuits, the correct output is computed even when the inputs are not synchronized. Two approaches of polysynchronous system design may be used to mitigate the costs of the CDNs. In the first approach, the global CDN is removed and instead locally generated clocks are used to design the Roberts cross stochastic system. Quantifying the costs and benefits, the maximum working frequency, the area, and the energy consumption improved by up to 12×, 39 percent, and 23 percent, respectively, for the Roberts cross system with 256 cells. For smaller systems, the area and energy overhead incurred by the local clock generators diminished the benefits of removing the CDN.

Experimental results showed that, for small scale stochastic circuits such as the Roberts cross circuits with 16 cells, the median filter noise reduction circuit, and the kernel density estimation based image segmentation circuit, relaxing the CDN is a more efficient choice. The area, speed, are energy are all improved by a relaxed CDN. Post-synthesis simulations on sample images showed that removing and relaxing the CDN not only did not degrade the quality of the output, but in some cases it actually improved the accuracy of results by introducing additional randomness. Circuits designed with either of these polysynchronous approaches are as tolerant of errors as conventional synchronous stochastic circuits.

Various embodiments of the invention have been described. These and other embodiments are within the scope of the following claims.

The invention claimed is:
1. A device comprising:
an integrated circuit including:
    a first computational unit configured to receive, as inputs, at least two input stochastic bit streams driven by respective input clocks that are unsynchronized;
    a second computational unit configured to produce one of the at least two input stochastic bit streams in accordance with one of the respective input clocks;
    a third computational unit configured to produce another of the at least two input stochastic bit streams in accordance with another of the respective input clocks;
    a central clock configured to generate a central clock signal; and
    a clock distribution circuit configured to distribute the central clock signal to the second computational unit and the third computational unit as the unsynchronized respective input clocks without having timing elements that substantially synchronize arrival of the central clock signal to the second computational unit and the third computational unit,
wherein the at least two input stochastic bit streams received by the first computational unit are misaligned in time in accordance with the unsynchronized respective input clocks of the second computational unit and the third computational unit,
wherein the first computational unit is configured to process the misaligned input stochastic bit streams to compute a result and produce an output stochastic bit stream representative of the result, and
wherein each of the stochastic bit streams comprises sequential sets of data bits, each of the sets of data bits representing a numerical value based on a probability that any bit in the respective set of data bits is one.

2. The device of claim 1, wherein the first computational unit is configured to tolerate a clock misalignment of at least ten percent, the clock misalignment representing a difference between arrival times for the respective input clocks at the second and third computational units.

3. The device of claim 2, wherein the first computational unit is configured to tolerate a clock misalignment of at least fifty percent.

4. The device of claim 2, wherein the first computational unit is configured to tolerate a clock misalignment of at least ninety percent.

5. The device of claim 1,
wherein each of the at least two input stochastic bit streams encodes image data, and
wherein the first computational unit is configured to perform image processing operations on the image data.

6. The device of claim 5,
wherein the device comprises an image processing device,
wherein the first, second, and third computational units include a first pixel processing unit of an array of pixel processing units,
wherein the at least two input stochastic bit streams include one or more input pixel values,
wherein each pixel processing unit of the array of pixel processing units is configured to convert an input pixel value into an output pixel value,
wherein each pixel processing unit of the array of pixel processing units includes a local clock configured to generate a respective input clock of the respective pixel processing unit, and
wherein the central clock comprises the respective local clock of the first pixel processing unit.

7. The device of claim 1,
wherein the first computational unit comprises a first logic gate configured to receive the at least two input stochastic bit streams, and
wherein the second and third computational units comprise a plurality of logic gates that are driven by the respective input clocks.

8. The device of claim 1, wherein the first computational unit is configured to tolerate a word length skew of at least one bit position in the at least two input stochastic bit streams, the word length skew representing a difference between arrival times for a first bit of the at least two input stochastic bit streams.

9. The device of claim 1,
wherein the central clock is a first central clock and the central clock signal is a first central clock signal,
wherein the at least two input stochastic bit streams are a first set of input stochastic bit streams,
wherein the respective input clocks are a first set of respective input clocks,
wherein the integrated circuit further comprises:
a fourth computational unit configured to receive, as inputs, a second set of input stochastic bit streams driven by a second set of respective input clocks that are unsynchronized;
a fifth computational unit configured to produce one of the second set of input stochastic bit streams in accordance with one of the second set of respective input clocks;
a sixth computational unit configured to produce another of the second set of input stochastic bit streams in accordance with another of the second set of respective input clocks;
a second central clock configured to generate a second clock signal; and
a clock distribution circuit configured to distribute the second central clock signal to the second computational unit and the third computational unit as the second set of unsynchronized respective input clocks without having timing elements that substantially synchronize arrival of the second central clock signal to the fifth and sixth computational units,
wherein each of the first and second clock signals is locally generated within the integrated circuit proximate respective computational units.

10. The device of claim 9,
wherein each of the first and second central clock signals has a respective period; and
wherein the integrated circuit is configured to tolerate a clock deviation of at least ten percent, the clock deviation representing a percent increase from a smaller one of the periods to a larger one of the periods for the first and second central clock signals.

11. The device of claim 10, wherein the integrated circuit is configured to tolerate clock deviation of at least ninety percent.

12. The device of claim 9,
wherein each of the first and second sets of input stochastic bit streams encodes image data, and
wherein the first and sixth computational units are configured to perform image processing operations on the image data.

13. The device of claim 12,
wherein the device comprises an image processing device,
wherein the first, second, and third computational units include a first pixel processing unit of an array of pixel processing units,
wherein the fourth, fifth, and sixth computational units include a second pixel processing unit of the array of pixel processing units,
wherein the first and second sets of input stochastic bit streams include one or more input pixel values,
wherein each pixel processing unit of the array of pixel processing units is configured to convert an input pixel value into an output pixel value,
wherein each pixel processing unit of the array of pixel processing units includes a local clock configured to generate a respective input clock of the respective pixel processing unit,
wherein the first central clock comprises the respective local clock of the first pixel processing unit, and
wherein the second central clock comprises the respective local clock of the second pixel processing unit.

14. The device of claim 9,
wherein the first computational unit comprises a first logic gate that receives the first set of input stochastic bit streams,
wherein the sixth computational unit comprises a second logic gate that receives the second set of input stochastic bit streams,
wherein the second and third computational units comprise a first set of logic gates that are driven by the first set of respective input clocks, and
wherein the fourth and fifth computational units comprise a second set of logic gates that are driven by the second set of respective input clocks.

15. The device of claim 1, wherein the first computational unit is configured to perform median filtering, spatial filtering, or kernel density estimation by at least processing the at least two input stochastic bit streams.

16. A method of operating an integrated circuit, wherein the integrated circuit comprises first, second, and third computational units, a central clock, and a clock distribution circuit, the method comprising:

generating, by the central clock, a central clock signal;
distributing, by the clock distribution circuit without having timing elements that substantially synchronize arrival of the central clock signal to the second computational unit and the third computational unit, the central clock signal to the second computational unit and the third computational unit as unsynchronized respective input clocks;
producing, at the second computational unit, one of at least two input stochastic bit streams in accordance with one of the respective input clocks;
producing, at the third computational unit, another of the at least two input stochastic bit streams in accordance with another of the respective input clocks;
receiving, at the first computational unit and as inputs, the at least two input stochastic bit streams driven by the respective input clocks that are unsynchronized,
wherein the at least two input stochastic bit streams received by the first computational unit are misaligned in time in accordance with the unsynchronized respective input clocks of the second computational unit and the third computational unit; and
processing, at the first computational unit, the misaligned input stochastic bit streams to compute a result and produce an output stochastic bit stream representative of the result,
wherein each of the stochastic bit streams comprises sequential sets of data bits, each of the sets of data bits representing a numerical value based on a probability that any bit in the respective set of data bits is one.

17. The method of claim 16, wherein the first computational unit is configured to tolerate a clock misalignment of at least ten percent, the clock misalignment representing a difference between arrival times for the respective input clocks at the second and third computational units.

18. The method of claim 16, wherein the first computational unit is configured to tolerate a clock misalignment of at least fifty percent, the clock misalignment representing a difference between arrival times for the respective input clocks at the second and third computational units.

19. The method of claim 16, wherein the first computational unit is configured to tolerate a clock misalignment of at least 100 percent, the clock misalignment representing a difference between arrival times for the respective input clocks at the second and third computational units.

20. The method of claim 16,
wherein each of the sets of data bits comprises N bits, and
wherein the first computational unit can tolerate input values that are misaligned temporally by at least one bit position in the at least two input stochastic bit streams.

21. The method of claim 16,
wherein the central clock is a first central clock and the central clock signal is a first central clock signal, wherein the at least two input stochastic bit streams are a first set of input stochastic bit streams, wherein the respective input clocks are a first set of respective input clocks, wherein the result is a second result, wherein the output stochastic bit stream is a second output stochastic bit stream, and
wherein the integrated circuit further comprises fourth, fifth, and sixth computational units, a second central clock, and a second clock distribution circuit, the method further comprising:
generating, by the second central clock, a second central clock signal;
distributing, by the second clock distribution circuit without having timing elements that substantially synchronize arrival of the second central clock signal to the fourth computational unit and the fifth computational unit, the second central clock signal to the fourth computational unit and the fifth computational unit as a second set of unsynchronized respective input clocks;
producing, at the fourth computational unit, one of a second set of at least two input stochastic bit streams in accordance with one of the second set of respective input clocks;
producing, at the fifth computational unit, another of the second set of at least two input stochastic bit streams in accordance with another of the second set of respective input clocks;
receiving, at the sixth computational unit and as inputs, the second set of at least two input stochastic bit streams driven by the second set of respective input clocks that are unsynchronized,
wherein the second set of at least two input stochastic bit streams received by the sixth computational unit are misaligned in time in accordance with the second set of unsynchronized respective input clocks of the fourth and fifth computational units; and
processing, at the sixth computational unit, the second set of misaligned input stochastic bit streams to compute a second result and produce a second output stochastic bit stream representative of the second result,
wherein each of the first and second central clock signals is independently locally generated within the integrated circuit proximate respective computational units by the first and second central clocks.

22. The method of claim 21,
wherein each of the first and second central clock signals has a respective period, and
wherein the integrated circuit is configured to tolerate a clock deviation of at least ten percent, the clock deviation representing a percent increase from a smaller one of the periods to a larger one of the periods for the first and second central clock signals.

* * * * *